United States Patent
Khan

(10) Patent No.: US 9,520,914 B2
(45) Date of Patent: Dec. 13, 2016

(54) FULL-DUPLEX WIRELESS COMMUNICATION SYSTEM USING POLARIZATION

(71) Applicant: Samsung Electronics Co., LTD, Suwon-si, Gyeonggi-do (KR)

(72) Inventor: Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 13/909,717

(22) Filed: Jun. 4, 2013

(65) Prior Publication Data

US 2013/0343235 A1    Dec. 26, 2013

Related U.S. Application Data

(60) Provisional application No. 61/664,016, filed on Jun. 25, 2012.

(51) Int. Cl.
*H04L 5/00* (2006.01)
*H04B 1/56* (2006.01)
*H04B 7/10* (2006.01)
*H04B 7/04* (2006.01)
*H04B 7/06* (2006.01)

(52) U.S. Cl.
CPC .............. *H04B 1/56* (2013.01); *H04B 7/0417* (2013.01); *H04B 7/10* (2013.01); *H04B 7/063* (2013.01); *H04B 7/0617* (2013.01)

(58) Field of Classification Search
None
See application file for complete search history.

(56) References Cited

U.S. PATENT DOCUMENTS

| | | |
|---|---|---|
| 5,311,592 A | 5/1994 | Udd |
| 5,867,485 A | 2/1999 | Chambers et al. |
| 5,905,574 A | 5/1999 | Vollbrecht et al. |
| 6,370,398 B1 | 4/2002 | Kanamaluru et al. |
| 6,778,779 B1 | 8/2004 | Shay et al. |
| 6,999,685 B1 | 2/2006 | Kawase et al. |
| 7,003,058 B2 | 2/2006 | Bach et al. |

(Continued)

FOREIGN PATENT DOCUMENTS

| | | |
|---|---|---|
| JP | 2003143028 A | 5/2003 |
| WO | WO 2006/131934 A2 | 12/2006 |

OTHER PUBLICATIONS

International Search Report dated Oct. 22, 2013 in connection with International Patent Application No. PCT/KR2013/005545, 3 pages.

(Continued)

*Primary Examiner* — Fan Ng

(57) ABSTRACT

A system, apparatus, and method use full duplexing with polarization. A wireless communication system includes a first transceiver configured to transmit and receive wireless signals to and from at least a second transceiver. The first transceiver includes a plurality of transmitter antennas and a plurality of receiver antennas. At least one of the transmitter antennas is configured to transmit a first signal with a first polarization weight to at least the second transceiver. At least one of the receiver antennas is configured to receive a second signal with a second polarization from the second transceiver. The second polarization is cross polarized with the first polarization.

20 Claims, 14 Drawing Sheets

(56) References Cited

U.S. PATENT DOCUMENTS

| | | | |
|---|---|---|---|
| 7,593,753 B1* | 9/2009 | Rausch | 455/562.1 |
| 8,457,026 B1* | 6/2013 | Ho et al. | 370/310 |
| 2003/0161419 A1* | 8/2003 | Bach et al. | 375/346 |
| 2003/0199270 A1* | 10/2003 | Hamalainen et al. | 455/424 |
| 2006/0087385 A1 | 4/2006 | Fitzpatrick et al. | |
| 2006/0292990 A1 | 12/2006 | Karabinis et al. | |
| 2010/0003034 A1* | 1/2010 | Pratt et al. | 398/152 |
| 2010/0248635 A1* | 9/2010 | Zhang et al. | 455/63.1 |
| 2011/0065390 A1 | 3/2011 | Asplund et al. | |
| 2011/0150052 A1* | 6/2011 | Erell et al. | 375/219 |
| 2012/0178501 A1* | 7/2012 | Jiang et al. | 455/561 |

OTHER PUBLICATIONS

Extended European Search Report issued for EP 13808998.2 dated Feb. 8, 2016, 10 pgs.

* cited by examiner

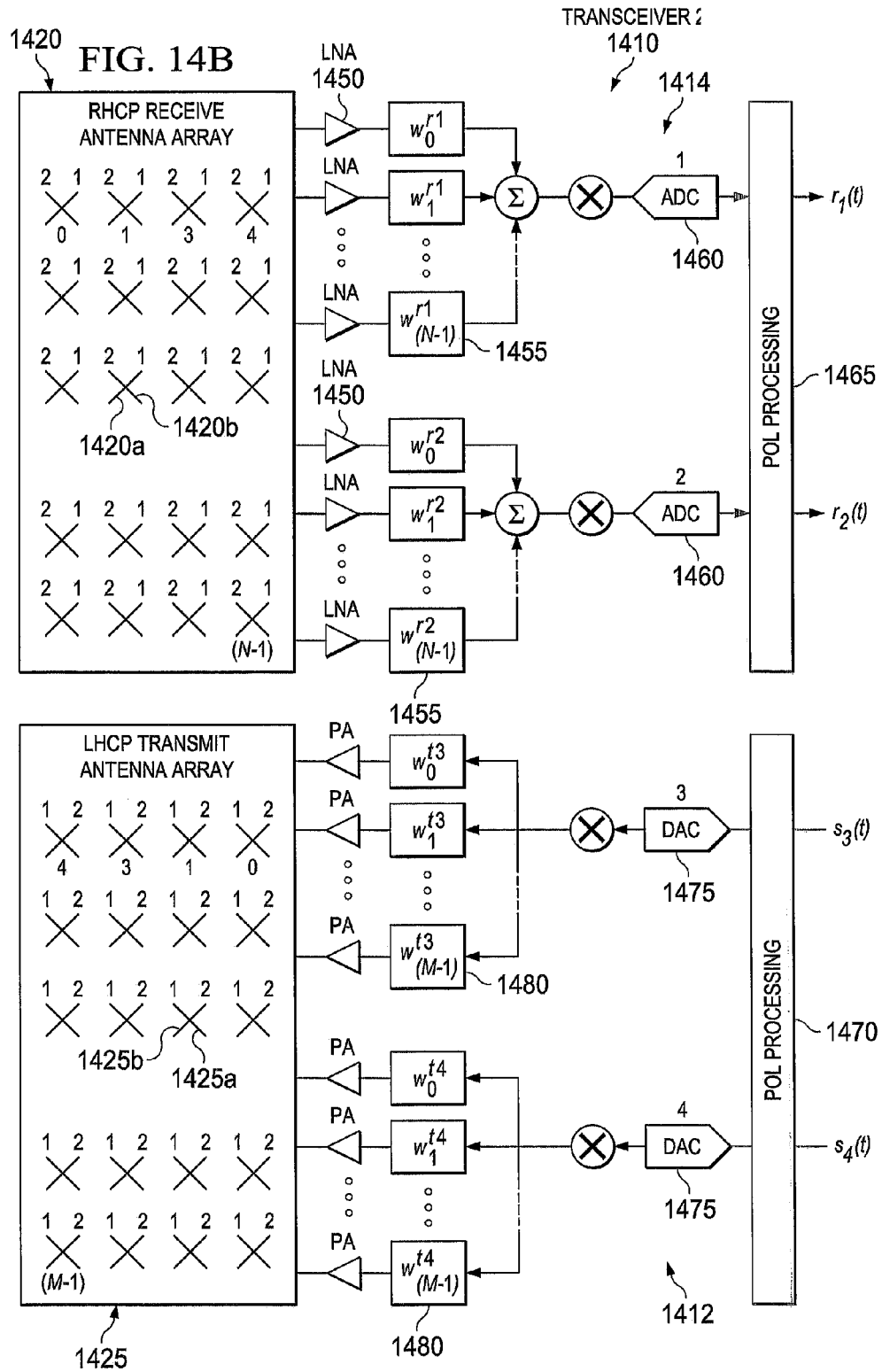

FULL-DUPLEX WIRELESS COMMUNICATION SYSTEM USING POLARIZATION

CROSS-REFERENCE TO RELATED APPLICATION AND CLAIM OF PRIORITY

The present application claims priority to U.S. Provisional Patent Application Ser. No. 61/664,016 filed Jun. 25, 2012, entitled "Full-Duplex System Using Polarization". The content of the above-identified patent document is incorporated herein by reference.

TECHNICAL FIELD

The present application relates generally to full duplex wireless communications and, more specifically, to the use of wave polarization in a full duplex wireless communication system.

BACKGROUND

The current wireless systems use either a Frequency Division Duplexing (FDD) or a Time Division Duplexing (FDD) approach. In an FDD approach, the uplink (mobile to base station link) and the downlink (base station to the mobile station link) use a different frequency. In general, the FDD systems make use of symmetric spectrum allocation (i.e. the bandwidth allocated to the downlink is the same as in the uplink). The examples of wireless systems using a FDD scheme are the 2G Global System for Mobile (GSM), 3G Universal Mobile Telecommunications System (UMTS) and 4G long term evolution (LTE) systems. Typically, the spectrum used for downlink transmissions are sufficiently separated in frequency from the spectrum used for uplink transmission to avoid interference between transmission and receiving operations at the same communication node.

In a TDD scheme, the uplink and the downlink share the same frequency band. However, the uplink and downlink transmissions happen at different times. In general, a frame of a given duration (T seconds) is divided into a downlink subframe (TDL) and an uplink subframe (TUL). Therefore, at a given time, the transmission happens either on the downlink or on the uplink. The Local Area Network (LAN) and Personal Area Network (PAN) standards, such as IEEE 802.11 and 802.15, as well as 3G/4G cellular systems, employ TDD.

In a full-duplex system, the uplink and the downlink share the same frequency band, and transmissions happen simultaneously in the same timeframe. A challenge of a full-duplex system is interference between the transmit and receive signals that are sent and received in the same timeframe.

Accordingly, there is a need for improved techniques in the full-duplex system.

SUMMARY

Embodiments of the present disclosure provide a full-duplex wireless communication using polarization to reduce interference between transmitted and received signals.

In one embodiment, a wireless communication system includes a first transceiver configured to transmit and receive wireless signals to and from at least a second transceiver. The first transceiver includes a plurality of transmitter antennas and a plurality of receiver antennas. At least one of the transmitter antennas is configured to transmit a first signal with a first polarization weight to at least the second transceiver. At least one of the receiver antennas is configured to receive a second signal with a second polarization from the second transceiver. The second polarization is cross polarized with the first polarization.

In another embodiment, an apparatus in a first transceiver is capable of transmitting and receiving wireless signals to and from at least a second transceiver. The apparatus includes a plurality of transmitter antennas and a plurality of receiver antennas. At least one of the transmitter antennas is configured to transmit a first signal with a first polarization weight to at least the second transceiver. At least one of the receiver antennas is configured to receive a second signal with a second polarization from the second transceiver. The second polarization is cross polarized with the first polarization.

In yet another embodiment, a method for transmitting and receiving wireless signals by a first transceiver is provided. The method includes transmitting, using at least one of a plurality of transmitter antennas in the first transceiver, a first signal with a first polarization weight to at least a second transceiver. Additionally, the method includes receiving, using at least one of a plurality of receiver antennas in the first transceiver, a second signal with a second polarization from the second transceiver in a same frequency band and during a same time period as the transmitting of the first signal. The second polarization is cross polarized with the first polarization.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 14A and 14B illustrate an example of a full-duplex wireless communication system using circular polarization antenna arrays according to embodiments of the present disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Beamforming is a technique used for directional signal transmission or reception in a wireless system. The spatial selectivity is achieved by using adaptive receive/transmit beam patterns. When transmitting, a beamformer controls the phase and relative amplitude of the signal at each transmitter antenna to create a pattern of constructive and destructive interference in the wavefront. The receiver combines information from different antennas in such a way that the expected pattern of radiation is preferentially observed. The improvement compared with an omnidirectional reception/transmission is known as the receive/transmit gain. For example, with N transmit antennas, a transmit beamforming gain of $10 \times \log_{10}(N)$ dB can be achieved. This is assuming that the total transmit power from the N antennas is the same as the transmit power from a single omnidirectional antenna. Similarly, with M receive antennas, a receive beamforming gain of $10 \times \log_{10}(M)$ dB can be achieved. When both transmit and receive beamforming is performed with N transmit and M receive antennas, a total combined beamforming gain of $10 \times \log_{10}(N \times M)$ dB can be achieved.

Figure 1:
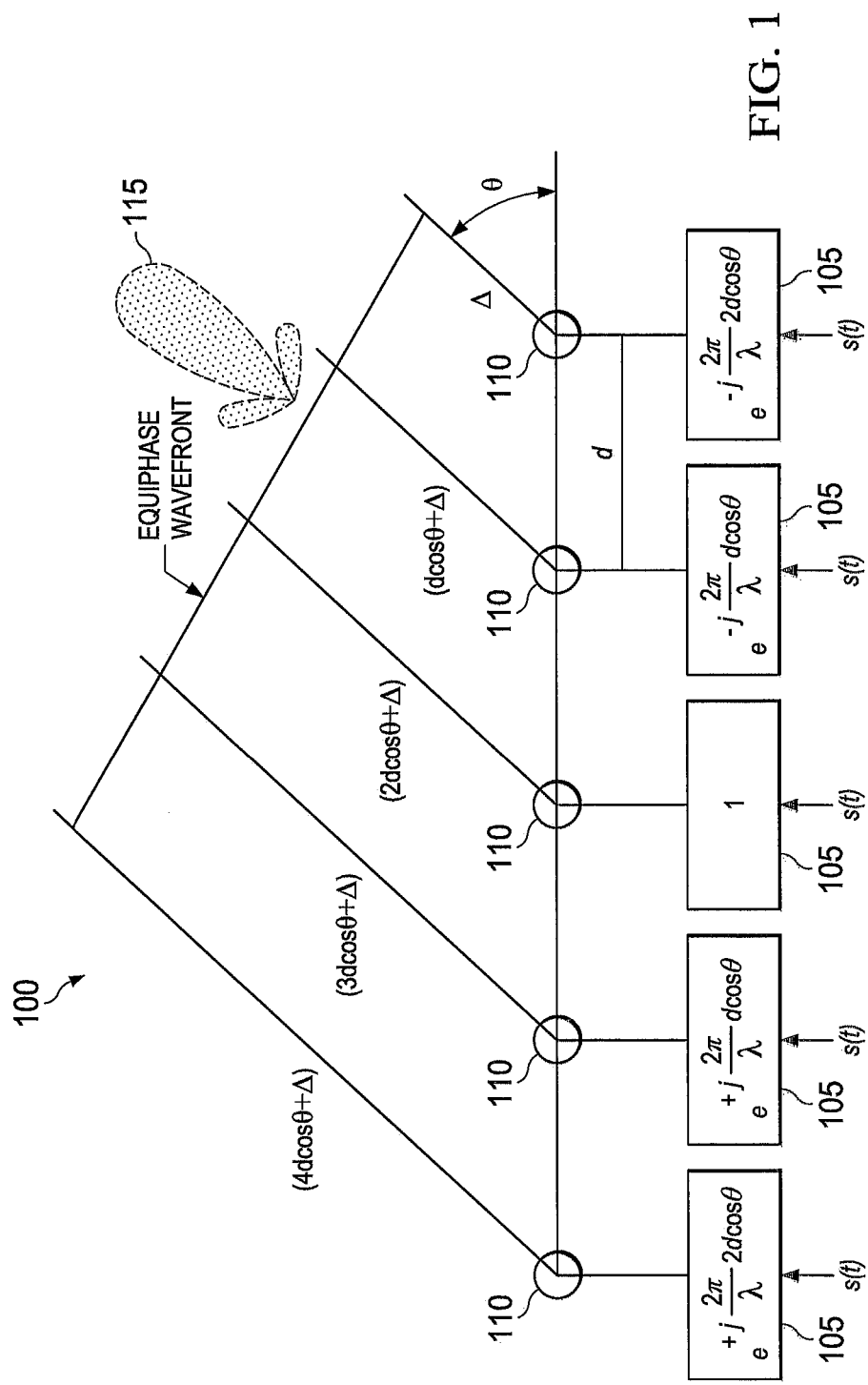
FIG. 1 illustrates dynamic beamforming according to embodiments of the present disclosure.

FIG. 1 illustrates dynamic beamforming according to embodiments of the present disclosure. The embodiment of the dynamic beamforming shown in FIG. 1 is for illustration only. Other embodiments could be used without departing from the scope of this disclosure.

A transceiver 100 with a uniform linear array (ULA) performs dynamic beamforming by adjusting weights 105 that are based on phase control. By using appropriate phase adjustments to signals transmitted (or received) from multiple antennas 110, a beam 115 can be steered in a particular direction.

Figure 2:
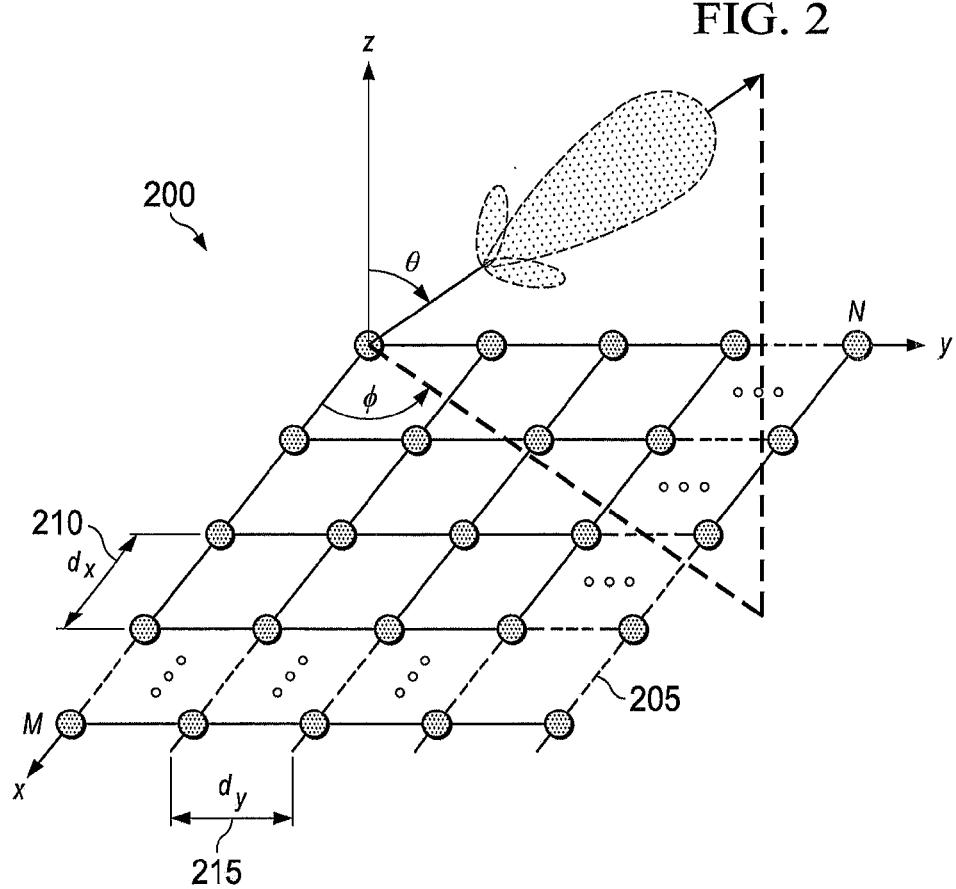
FIG. 2 illustrates a two-dimensional array according to embodiments of the present disclosure.

FIG. 2 illustrates a two-dimensional (2D) array according to embodiments of the present disclosure. The embodiment of the 2-D antenna array 200 shown in FIG. 2 is for illustration only. Other embodiments could be used without departing from the scope of this disclosure.

With a ULA, a transmitter can steer a beam in a single plane containing the line of the antenna elements' centers. In order to steer the beam in any direction, such as horizontal and vertical steering from a base station, the transmitter employs a 2-D antenna array 200, as shown. The array grid 205 can have equal or unequal row spacings ($d_x$) 210 and column spacings ($d_y$) 215.

Figure 3:
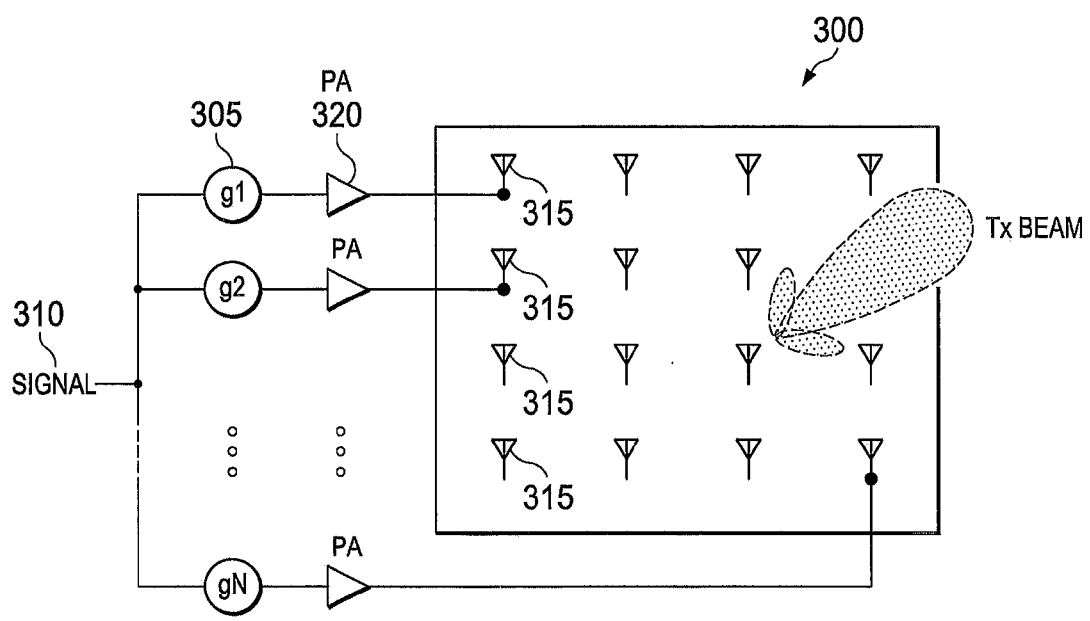
FIG. 3 illustrates a transmit beamforming according to embodiments of the present disclosure.

FIG. 3 illustrates a transmit beamforming according to embodiments of the present disclosure. The embodiments of the transmit beamforming 300 shown in FIG. 3 is for illustration only. Other embodiments could be used without departing from the scope of this disclosure.

A transmitter applies a beamforming weight or gain $g_i$ 305 to the signal 310 transmitted from the ith transmit antenna. The transmitter applies the gain 305 to adjust the phase and relative amplitude of the signal 310 transmitted from each of the transmit antennas 315. The signal 310 can be amplified 320 separately for transmission from each of the transmit antennas 315. In certain embodiments, a single amplifier 320 is used regardless of the number of transmit antennas 315. In certain embodiments, the transmitter includes a fewer number of amplifiers 320 than the number of transmit antennas 315. That number of amplifiers 320 is less than the number of transmit antennas 315 used. In certain embodiments, the beamforming weights or gains 305 are applied before signal amplification 320. In certain embodiments, the beamforming weights or gains 305 are applied after signal amplification 320.

Figure 4:
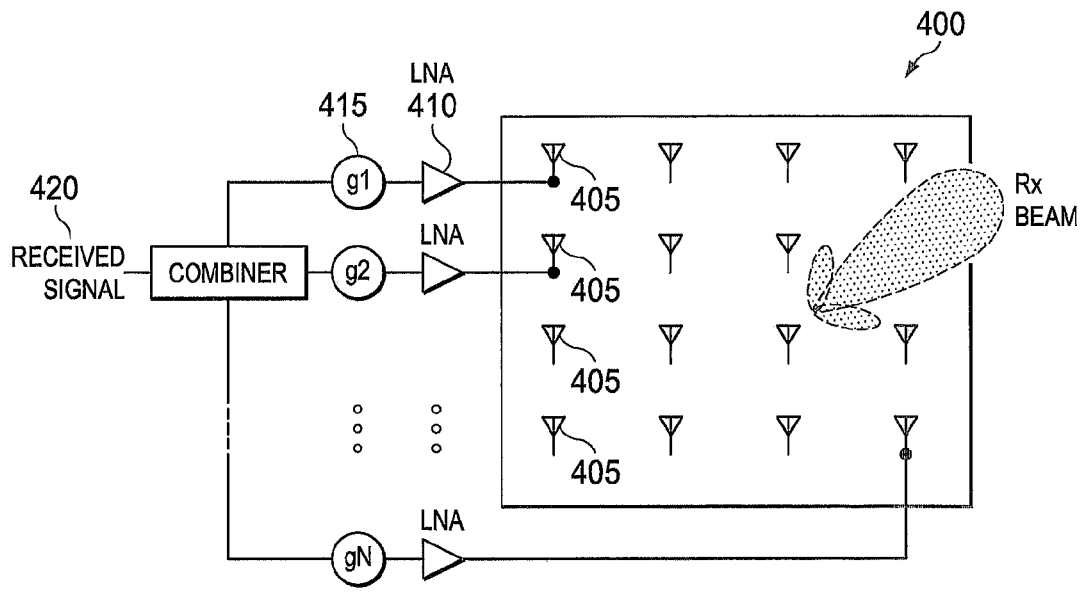
FIG. 4 illustrates a receive beamforming according to embodiments of the present disclosure.

FIG. 4 illustrates a receive beamforming according to embodiments of the present disclosure. The embodiments of the receive beamforming 400 shown in FIG. 4 is for illustration only. Other embodiments could be used without departing from the scope of this disclosure.

Each received signal from each receive antenna 405 is amplified by a low-noise amplifier (LNA) 410. The receiver applies a beamforming weight or gain gi 415 to the signal 420 received and amplified from the ith receive antenna 405. The receiver uses the gain 415 to adjust the phase and relative amplitude of the signal 420 received from each of the receive antennas 405. The phase and amplitude adjusted signals are combined to produce the received signal 420. The receive beamforming gain 415 is obtained because of coherent or constructive combining of the signals from each receive antenna 405.

Figure 5:
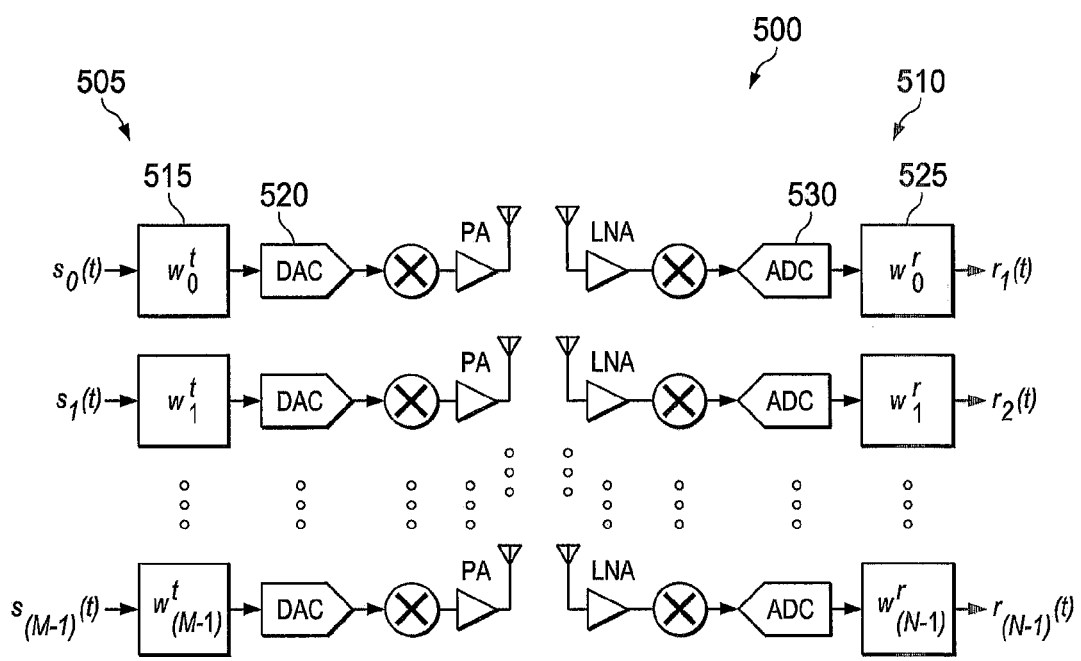
FIG. 5 illustrates digital beamforming according to embodiments of the present disclosure.

FIG. 5 illustrates digital beamforming according to embodiments of the present disclosure. The embodiment of the digital beamforming 500 shown in FIG. 5 is for illustration only. Other embodiments could be used without departing from the scope of this disclosure.

In the example shown in FIG. 5, a transmitter 505 uses digital beamforming techniques to transmit a signal. A receiver 510 uses corresponding digital beamforming techniques to receive the signal.

Different beamforming architectures that enable different tradeoffs between performance, complexity, and flexibility are possible. For example, the digital beamforming approach 500 enables optimal capacity for all channel conditions while requiring very high hardware complexity with M (N) full transceivers. This architecture also results in very high system power consumption. The beamforming weights 515 at the transmitter 505 $W_0^t$-$W_{(M-1)}^t$ are applied before signal conversion to analog, that is, before the Digital to Analog (DAC) conversion block 520. The beamforming weights 525 at the receiver 510 $W_0^r$-$W_{(M-1)}^r$ are applied after the signal is converted to digital using an Analog to Digital (ADC) converter 530.

Figure 6:
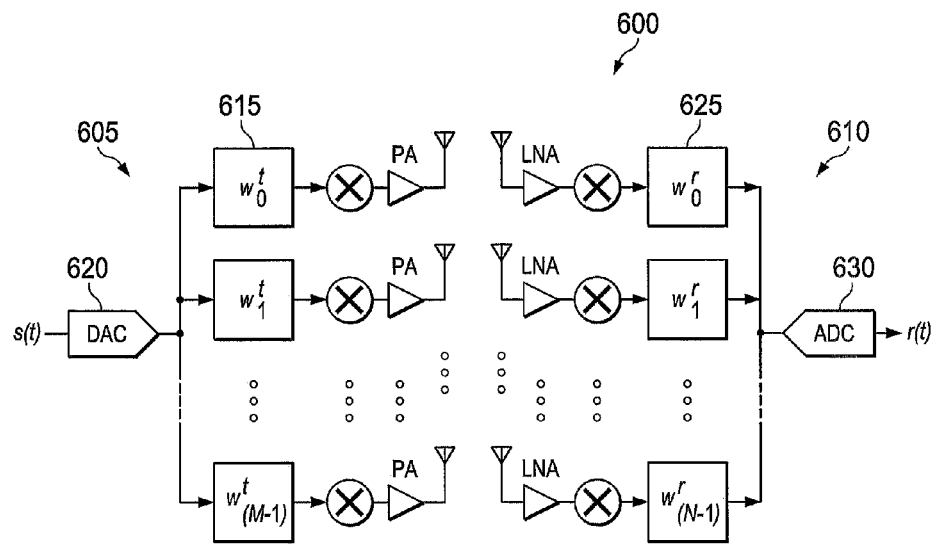
FIG. 6 illustrates analog beamforming according to embodiments of the present disclosure.

FIG. 6 illustrates analog beamforming according to embodiments of the present disclosure. The embodiment of the analog beamforming 600 shown in FIG. 6 is for illustration only. Other embodiments could be used without departing from the scope of this disclosure.

In the example shown in FIG. 6, a transmitter 605 uses analog beamforming techniques to transmit a signal. A receiver 610 uses corresponding analog beamforming techniques to receive the signal.

Analog baseband beamforming 600 reduces the number of data converters (ADC/DAC) providing intermediate complexity and power consumption while losing some flexibility in beamforming control. The beamforming weights 615 at the transmitter 605 $W_0^t$-$W_{(M-1)}^t$ are applied after signal conversion to analog, that is, after the Digital to Analog (DAC) conversion block 620. The beamforming weights 625 at the receiver 610 $W_0^r$-$W_{(M-1)}^r$ are applied before the signal is converted to digital using an Analog to Digital (ADC) converter 630.

Figure 7:
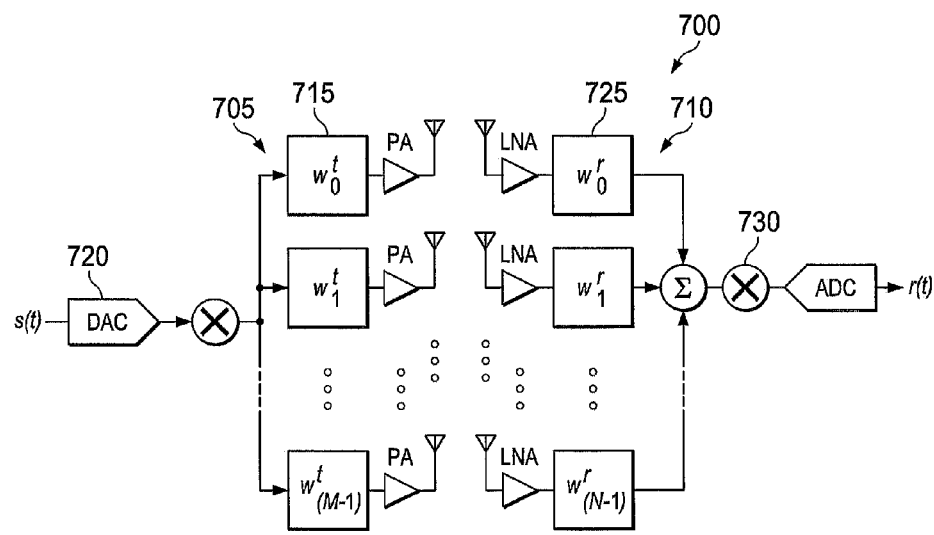
FIG. 7 illustrates Radio Frequency beamforming according to embodiments of the present disclosure.

FIG. 7 illustrates Radio Frequency (RF) beamforming according to embodiments of the present disclosure. The embodiment of the RF beamforming 700 shown in FIG. 7 is for illustration only. Other embodiments could be used without departing from the scope of this disclosure.

In the example shown in FIG. 7, a transmitter 705 uses analog beamforming techniques to transmit a signal. A receiver 710 uses corresponding analog beamforming techniques to receive the signal.

The RF beamforming 700 reduces the number of mixers required in addition to reducing the number of data converters (ADC/DAC), therefore providing lowest complexity and power consumption. However, this reduction in complexity comes at the expense of reduced flexibility in beamforming control as well as the limited options for multiple access to serve multiple users simultaneously. The beamforming weights 715 at the transmitter 705 $W_0^t$-$W_{(M-1)}^t$ are applied after signal up-conversion to RF frequency, that is, after the mixer block 720. The beamforming weights 725 at the receiver 710 $W_0^r$-$W_{(M-1)}^r$ are applied before signal is down-converted from RF, that is, before the mixer block 730.

In certain embodiments, other approaches, such as phase and/or amplitude control of the Local Oscillator (LO) signal in conjunction with an LO distribution network, are used for beamforming weights control.

Embodiments of the present disclosure recognize that approaches to enable full-duplex transmissions at the same frequency and at the same time have been proposed. For example, antenna elements may be arranged to cancel transmit signals at the receive antennas. With half-wavelength spacing between the antennas, the transmit antennas signals arrive out-of-phase at the receive antennas and, hence, cancel each other thereby reducing interference to the received signals on the receive antennas. In another example, a 180 degree phase shift (antenna weight) may be applied to one of the transmit antennas so that the received signals at the receive antennas arrive out-of-phase and, hence, cancel each other. Embodiments of the present disclosure recognize that the problem with these approaches is that these schemes only work at a fixed frequency. When frequency changes, the wavelength changes and, therefore, the transmit signals are not canceled at the receiver thereby generating interference.

Accordingly, embodiments of the present disclosure provide antenna systems and associated apparatus and methods that allow full-duplex transmission operation at a wide-range of frequencies. Embodiments of the present disclosure utilize antenna polarization to reduce and/or cancel interference, thereby allowing full-duplex transmission operation at a wide-range of frequencies.

The polarization of an antenna is the orientation of the electric field (E-plane) of the radio wave with respect to the Earth's surface and is determined by the physical structure of the antenna and by its orientation. Thus, a simple straight wire antenna will have one polarization when mounted vertically and a different polarization when mounted horizontally. That is, a vertically mounted antenna emits a vertically polarized signal, and a horizontally mounted antenna emits a horizontally polarized signal.

In the most general case, polarization is elliptical, meaning that the polarization of the radio waves varies over time (i.e., vertically to horizontally). Two special cases are linear polarization (the ellipse collapses into a line) and circular polarization (in which the two axes of the ellipse are equal). In linear polarization, the antenna compels the electric field of the emitted radio wave to a particular orientation. Depending upon the orientation of the antenna mounting, the usual linear cases are horizontal polarization and vertical polarization. In circular polarization, the antenna continuously varies the electric field of the radio wave through all possible values of its orientation with regard to the Earth's surface. Circular polarizations are classified as Right Hand Circularly Polarized (RHCP) and Left Hand Circularly Polarized (LHCP), which is appearing clockwise rotating or counter-clockwise rotating from the point of view of the source. Therefore, left or right handedness is determined by pointing one's left or right thumb away from the source, in the same direction that the wave is propagating, and matching the curling of one's fingers to the direction of the temporal rotation of the field at a given point in space. In other words, if the rotation is clockwise looking in the direction of propagation, the sense is called RHCP. If the rotation is counterclockwise, the sense is called LHCP.

According to elliptical polarization, the polarization of electromagnetic radiation is such that the tip of the electric field vector describes an ellipse in any fixed plane intersecting, and normal to, the direction of propagation. An elliptically polarized wave may be resolved into two linearly polarized waves in phase quadrature, with their polarization planes at right angles to each other. Since the electric field can rotate clockwise or counterclockwise as it propagates, Right Hand Elliptical Polarization (RHEP) and Left Hand Elliptical Polarization (LHEP) can be differentiated. Furthermore, other forms of polarization, such as circular and linear polarization, can be considered to be special cases of elliptical polarization.

In the case of a circularly polarized wave, the tip of the electric field vector, at a given point in space, describes a circle as time progresses. Similar to elliptical polarization, the electric field rotates either clockwise or counterclockwise as it propagates, thus exhibiting RHCP or LHCP. A number of different types of antenna elements, such as dipole elements, helical elements, or patch elements, are utilized to produce circularly polarized radiation.

Cross polarization (sometimes referenced as X-pol) is the polarization orthogonal to the polarization being discussed. For example, if the fields from an antenna are meant to be horizontally polarized, the cross-polarization in this case is vertical polarization. If the polarization is RHCP, the cross-polarization is LHCP.

Figure 8:
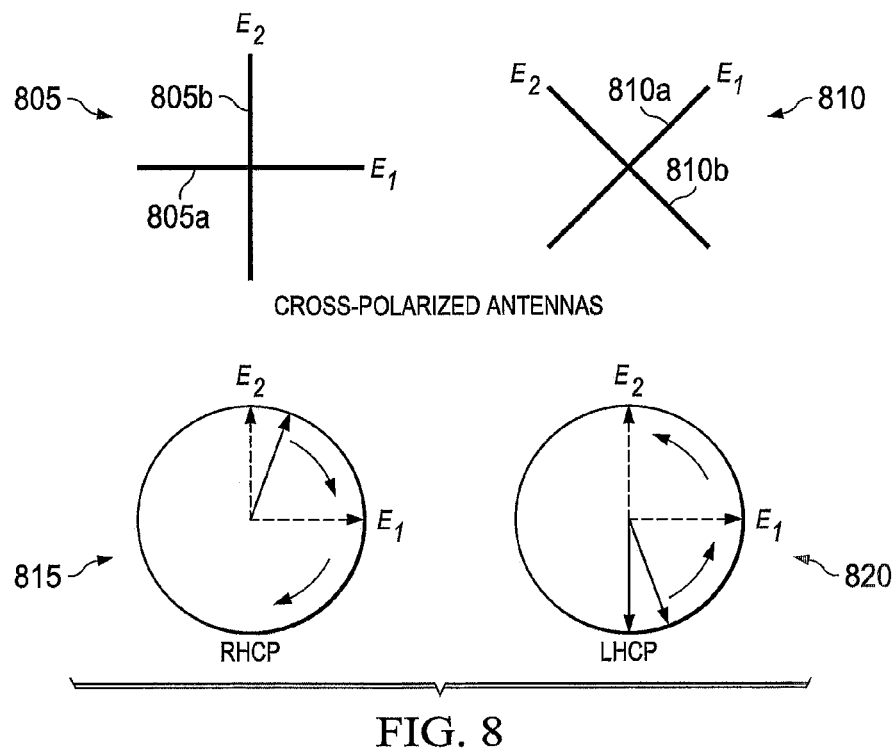
FIG. 8 illustrates cross polarization according to embodiments of the present disclosure.

FIG. 8 illustrates cross polarization according to embodiments of the present disclosure. The embodiments of the cross polarizations shown in FIG. 8 are for illustration only. Other embodiments could be used without departing from the scope of this disclosure.

Cross polarized antennas 805 and 810 create RHCP 815 and LHCP 820. For example, the circularly polarized wave is generated by using two antennas 805a and 805b, such as dipoles, where the first antenna 805a is placed in Vertical position and the second antenna 805b in Horizontal position. The antennas 805a and 805b are orthogonal to each other. That is, the angle between these two antennas is 80°. Therefore, it is also possible to place these antennas on "X" arrangement 810, the first antenna 810a with an angle of 45°, and the second antenna 810b with an angle of 135°. The electric fields from the two cross-polarized antennas 805a and 805b (or 810a and 810b) are represented as $E_1$ and $E_2$. The RHCP wave 815 is generated when the field $E_2$ is leading the field $E_1$ by 90° degrees ($\pi/2$ radians). Similarly, LHCP wave is generated when the field $E_1$ is leading the field $E_2$ by 90° degrees ($\pi/2$ radians).

Figure 9:
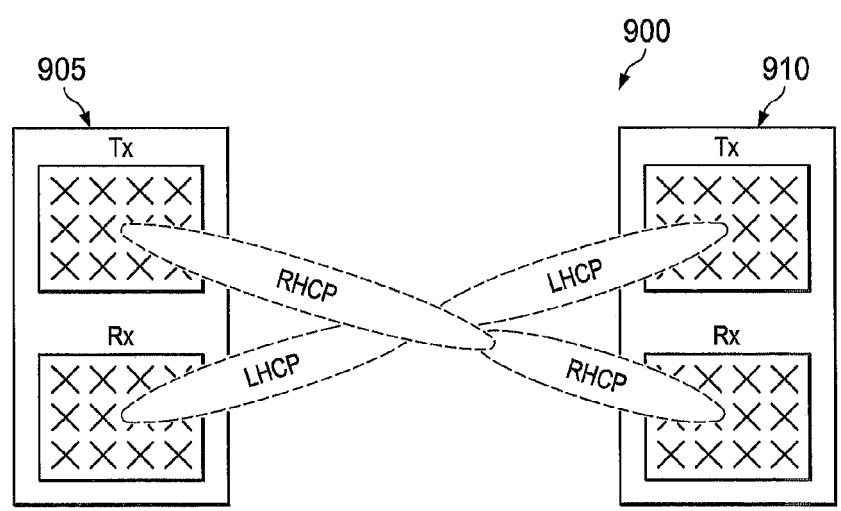
FIG. 9 illustrates an example of a full-duplex wireless communication system using circular polarization according to embodiments of the present disclosure.

FIG. 9 illustrates an example of a full-duplex wireless communication system 900 using circular polarization according to embodiments of the present disclosure. The embodiment of the full-duplex wireless communication system 900 shown in FIG. 9 is for illustration only. Other embodiments could be used without departing from the scope of this disclosure.

In this illustrative embodiment, the wireless communication system 900 includes transceiver 905 and transceiver 910 that exchange data with each other. The transceiver 905 transmits signals using RHCP, while transceiver 910 receives signals using RHCP. The transceiver 910 transmits signals using LHCP, while transceiver 905 receives signals using LHCP. Because both transceiver 905 and transceiver 910 use different polarizations for transmit and receive signals, the interference between transmit and receive signals is reduced and/or minimized, thus enabling efficient full-duplex operation.

Figure 10:
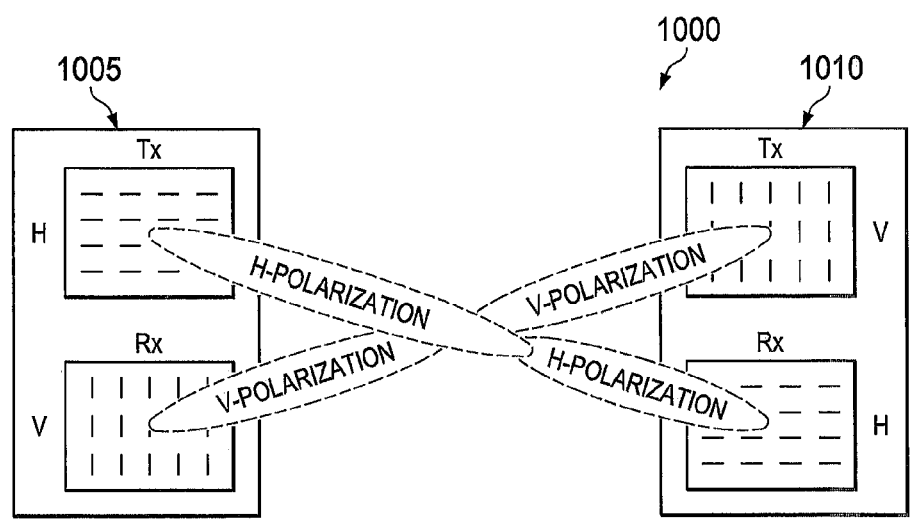
FIG. 10 illustrates an example of a full-duplex wireless communication system using linear polarization according to embodiments of the present disclosure.

FIG. 10 illustrates an example of a full-duplex wireless communication system 1000 using linear polarization according to embodiments of the present disclosure. The embodiment of the full-duplex wireless communication system 1000 shown in FIG. 10 is for illustration only. Other embodiments could be used without departing from the scope of this disclosure.

In this illustrative embodiment, the wireless communication system 1000 includes transceiver 1005 and transceiver 1010 that exchange data with each other. The transceiver 1005 transmits signals using Horizontal Polarization (H-Pol), while transceiver 1010 receives signals using Horizontal Polarization (H-Pol). The transceiver 1010 transmits signals using Vertical Polarization (V-Pol), while transceiver 1005 receives using Vertical Polarization (V-Pol). Because both transceiver 1005 and transceiver 1010 use different polarizations for transmit and receive signals, the interference between transmit and receive signals is reduced and/or minimized, thus enabling efficient full-duplex operation.

Figure 11:
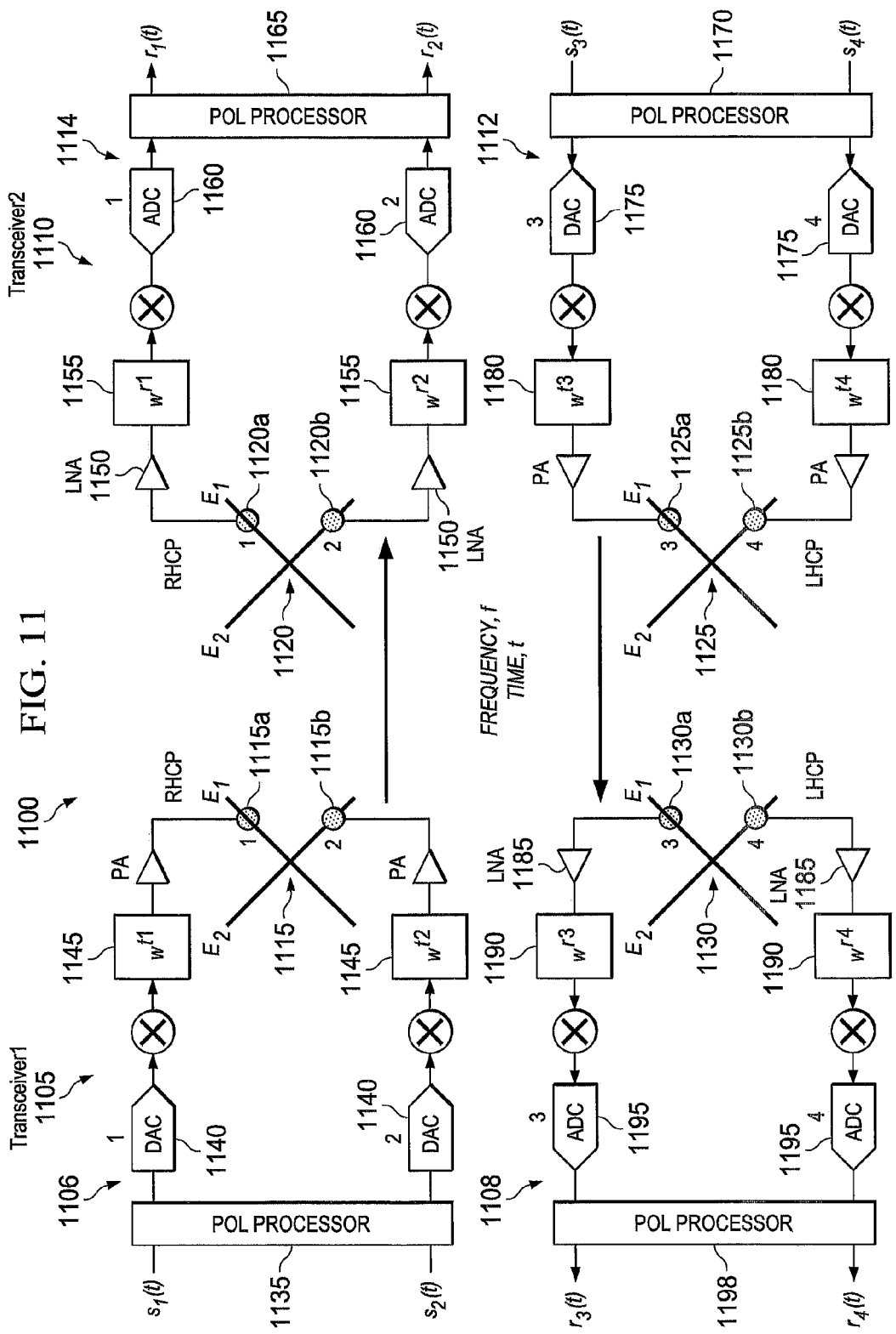
FIG. 11 illustrates an example of a full-duplex wireless communication system using cross-polarized antennas according to embodiments of the present disclosure.

FIG. 11 illustrates an example of a full-duplex wireless communication system 1100 using cross-polarized antennas according to embodiments of the present disclosure. The embodiment of the full-duplex wireless communication system 1100 shown in FIG. 11 is for illustration only. Other embodiments could be used without departing from the scope of this disclosure.

In this illustrative embodiment, the wireless communication system 1100 includes transceiver 1105 and transceiver 1110 that use cross-polarized antennas 1115-1130. The two digital signals $s_1$ and $s_2$ in transceiver 1105 are processed by a transmitter polarization processor 1135, converted to analog signals by a DAC 1140, up-converted to RF, and transmitted from antenna 1115a and 1115b, respectively. After up-conversion, the two signals can be further weighted by RF gains and phase shifts implemented by the blocks $W^{t1}$ and $W^{t2}$ 1145 before transmissions from the cross-polarized antennas 1115a and 1115b, respectively. In the transceiver 1110, the signals transmitted by transceiver 1105 are received by the cross-polarized receiver antennas 1120a and 1120b, amplified by an LNA 1150, weighted by RF gains and phase shifts implemented by the blocks $W^{r1}$ and $W^{r2}$ 1155, and down-converted from RF. The down-converted signals are further converted to digital signals by an ADC 1160 and processed by a receiver polarization processor 1165.

Similarly, the two digital signals $s_3$ and $s_4$ in transceiver 1110 are processed by a transmitter polarization processor 1170, converted to analog signals by a DAC 1175, upconverted to RF, and transmitted from antennas 1125a and 1125b, respectively. After up-conversion, the two signals can be further weighted by RF gains and phase shifts implemented by the blocks $W^{t3}$ and $W^{t4}$ 1180 before transmissions from the cross-polarized antennas 1125a and 1125b, respectively. In the transceiver 1105, the signals transmitted by transceiver 1110 are received by the cross-polarized receiver antennas 1130a and 1130b, amplified by an LNA 1185, weighted by RF gains and phase shifts implemented by the blocks $W^{r3}$ and $W^{r4}$ 1190, and down-converted from RF. The down-converted signals are further converted to digital signals by an ADC 1195 and processed by a receiver polarization processor 1198.

The transmitter 1106 in the transceiver 1105 transmits signals using RHCP, while the receiver 1114 in the transceiver 1110 receives signals using RHCP. The transmitter 1112 in the transceiver 1110 transmits signals using LHCP, while the receiver 1108 in the transceiver 1105 receives signals using LHCP. Both transceivers transmit and receive signals simultaneously on the same frequency and at the same time providing a full-duplex operation. However, the transceiver 1105 and transceiver 1110 use different polarizations for transmit and receive signals, thereby reducing and/or eliminating the interference between transmit and receive signals.

The received signals in transceiver 1105 and transceiver 1110 can be expressed according to equation 1 below as:

$$\begin{bmatrix} r_1 \\ r_2 \end{bmatrix} = P_r^2 H P_t^1 \begin{bmatrix} s_1 \\ s_2 \end{bmatrix} + \begin{bmatrix} n_1 \\ n_2 \end{bmatrix} \quad [\text{Eqn. 1}]$$

-continued $$\begin{bmatrix} r_3 \\ r_4 \end{bmatrix} = P_r^1 H P_t^2 \begin{bmatrix} s_3 \\ s_4 \end{bmatrix} + \begin{bmatrix} n_1 \\ n_2 \end{bmatrix}$$

where $P_t^1$ and $P_r^1$ are transmitter and receiver polarization processing matrices, respectively, in transceiver 1105, and $P_t^2$ and $P_r^2$ are transmitter and receiver polarization processing matrices, respectively, in transceiver 1110, H is channel matrix, $n_1$ and $n_2$ are noise components added to the signals received on the two cross-polarized antennas 1120 in transceiver 1110, and $n_3$ and $n_4$ are noise components added to the signals received on the two cross-polarized antennas 1130 in transceiver 1105.

For simplicity, by ignoring the RF gains and phase shifts at the transmitter and the receiver (i.e., $W^{t1}=W^{t2}=W^{t3}=W^{t4}=W^{r1}=W^{r2}=W^{r3}=W^{r4}=1$), the transmitter polarization processing matrices for RHCP and LHCP can be expressed according to equation 2 below as:

$$P_t^{RHCP} = \begin{bmatrix} 1 & 0 \\ 0 & e^{j\frac{\pi}{2}} \end{bmatrix}$$ [Eqn. 2]

$$P_t^{LHCP} = \begin{bmatrix} e^{j\frac{\pi}{2}} & 0 \\ 0 & 1 \end{bmatrix}.$$

For example, for RHCP transmission by transmitter 1106 in transceiver 1105, the signal transmitted from antenna 1115b, $s_2$ (field $E_2$) is leading the signal transmitted from antenna 1115a, $s_1$ (field $E_1$) by 90° degrees ($\pi/2$ radians). Similarly, for LHCP transmission by transmitter 1112 from transceiver 1110, the signal transmitted from antenna 1125a, $s_3$ (field $E_1$) is leading the signal transmitted from antenna 1125b, $s_4$ (field $E_2$) by 90° degrees ($\pi/2$ radians).

Figure 12:
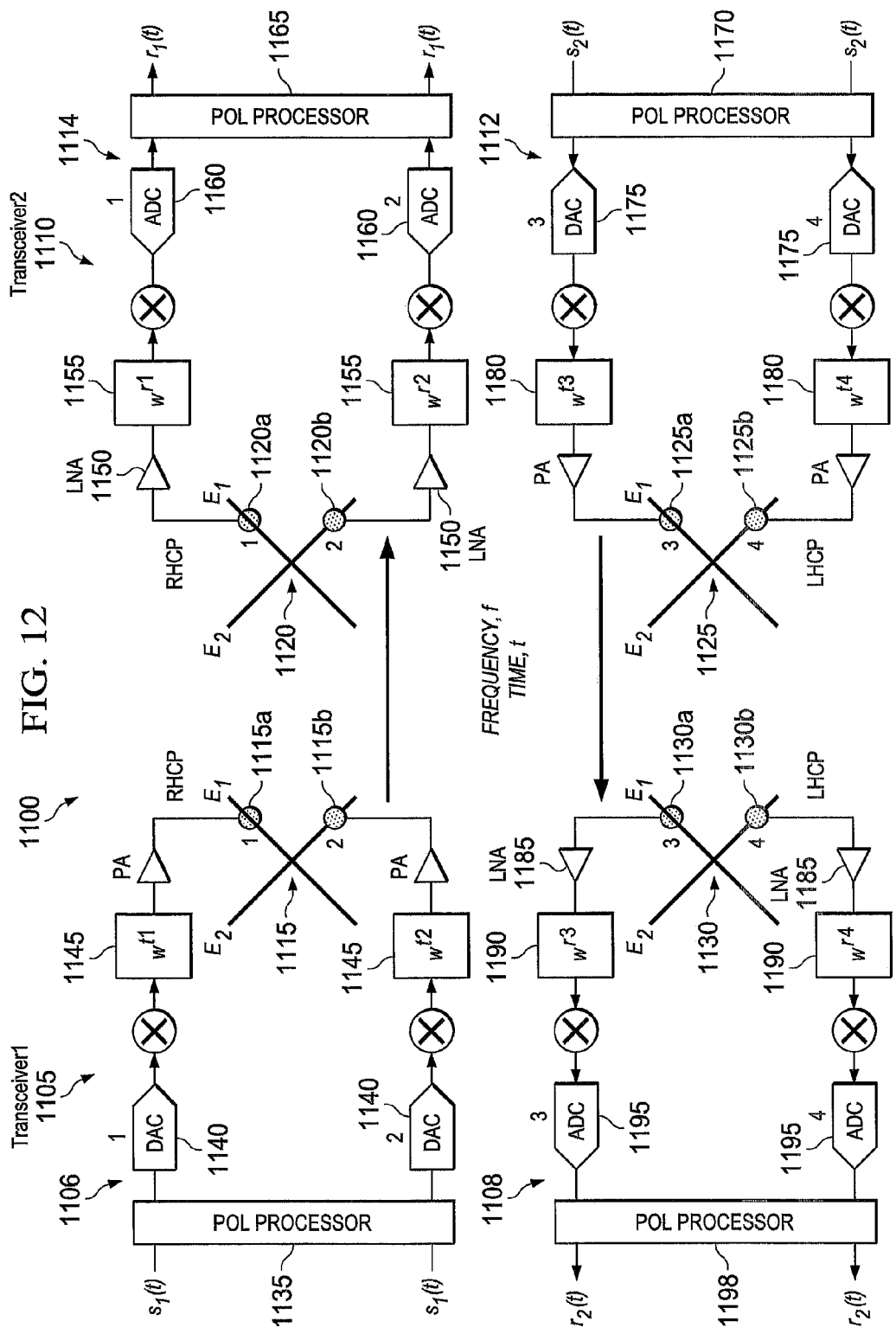
FIG. 12 illustrates another example of the full-duplex wireless communication system using cross-polarized antennas illustrated in FIG. 11 according to embodiments of the present disclosure.

FIG. 12 illustrates another example of the full-duplex wireless communication system 1100 using cross-polarized antennas according to embodiments of the present disclosure. The embodiment of the full-duplex wireless communication system 1100 shown in FIG. 12 is for illustration only. Other embodiments could be used without departing from the scope of this disclosure.

In this illustrative embodiment, the same signal $s_1$ is transmitted from both the antennas 1115 of transceiver 1105 while the same signal $s_2$ is transmitted from both the antennas 1125 of transceiver 1110. The transmitter 1106 in transceiver 1105 transmits the signals using RHCP, while the receiver 1114 in transceiver 1110 receives signals using RHCP. The transmitter 1112 in transceiver 1110 transmits signals using LHCP, while the receiver 1108 in the transceiver 1105 receives signals using LHCP. Both transceivers 1105 and 1110 transmit and receive signals simultaneously on the same frequency and at the same time providing a full-duplex operation. However, the transceiver 1105 and transceiver 1110 use different polarizations for transmit and receive signals, thereby reducing and/or eliminating the interference between transmit and receive signals.

Figure 13:
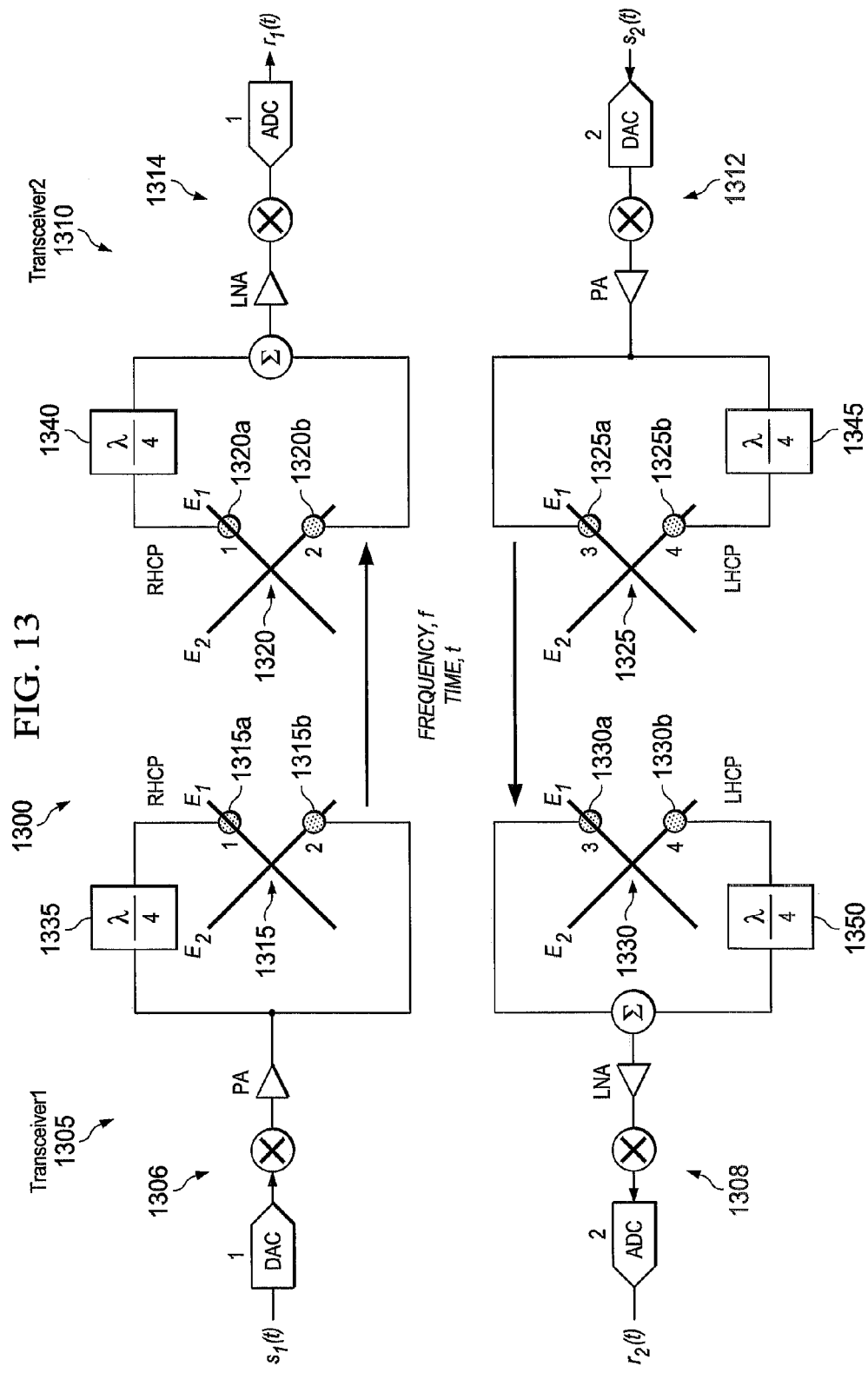
FIG. 13 illustrates an example of a full-duplex wireless communication system using phase shift/time delay blocks according to embodiments of the present disclosure.

FIG. 13 illustrates an example of a full-duplex wireless communication system 1300 using phase shift/time delay blocks according to embodiments of the present disclosure. The embodiment of the full-duplex wireless communication system 1300 shown in FIG. 13 is for illustration only. Other embodiments could be used without departing from the scope of this disclosure.

In this illustrative embodiment, phase shift/time delay blocks 1335-1350 are included on one of the signal paths in each of the transmitters and receivers in transceivers 1305 and 1310, respectively. For example, the phase shift/time delay block 1335 in transmitter 1306 may add a λ/4 transmission line time phase shift/time delay to antenna 1315a for signal transmission from transceiver 1305. This will introduce an approximately 90° time-phase difference between the two orthogonal field components on the two transmit antennas 1315a and 1315b. Therefore, the transmit antennas 1315a and 1315b transmit an RHCP wave. Similarly, the phase shift/time delay block 1340 in receiver 1314 may add a λ/4 transmission line time phase shift/time delay to antenna 1320a for signal reception at transceiver 1310. This will introduce an approximately 90° time-phase difference between the two orthogonal field components on the two receive antennas 1320a and 1320b. Therefore, the receive antennas 1320a and 1320b receive an RHCP wave only.

Additionally, the phase shift/time delay block 1345 in transmitter 1312 may add a λ/4 transmission line time phase shift/time delay to antenna 1325b for signal transmission from transceiver 1310. This will introduce a 90° time-phase difference between the two orthogonal field components on the two transmit antennas 1325a and 1325b. Therefore, the transmit antennas 1325a and 1325b transmit an LHCP wave. Similarly, the phase shift/time delay block 1350 in receiver 1308 may add a λ/4 transmission line time phase shift/time delay to antenna 1330b for signal reception at transceiver 1305. This will introduce a 90° time-phase difference between the two orthogonal field components on the two receive antennas 1330a and 1330b. Therefore, the receive antennas 1330a and 1330b receive an LHCP wave.

Both transceivers 1305 and 1310 transmit and receive signals simultaneously on the same frequency and at the same time providing a full-duplex operation. However, the transceivers 1305 and 1310 use different polarizations for transmit and receive signals, thereby reducing and/or eliminating the interference between transmit and receive signals.

While the phase shift/time delay blocks 1335-1350 are described as introducing a transmission line time phase shift/time delay to introduce a 90° time-phase difference between the two orthogonal field components, other phase shift/time delays may be introduced. For example, the polarization may be adjusted or aligned based on channel conditions or other influences that exist between the transceivers 1305 and 1310. In some embodiments, the phase shift/time delay blocks 1335-1350 may be programmable and/or otherwise adjustable to compensate for adjustment and/or alignment of the wave polarization. Additional description and examples of adjustment and/or alignment of polarization is described in U.S. patent application Ser. No. 13/599,795, filed Aug. 30, 2012, and entitled "APPARATUS AND METHOD FOR POLARIZATION ALIGNMENT IN A WIRELESS NETWORK", which is incorporated by reference herein.

Figure 14A:
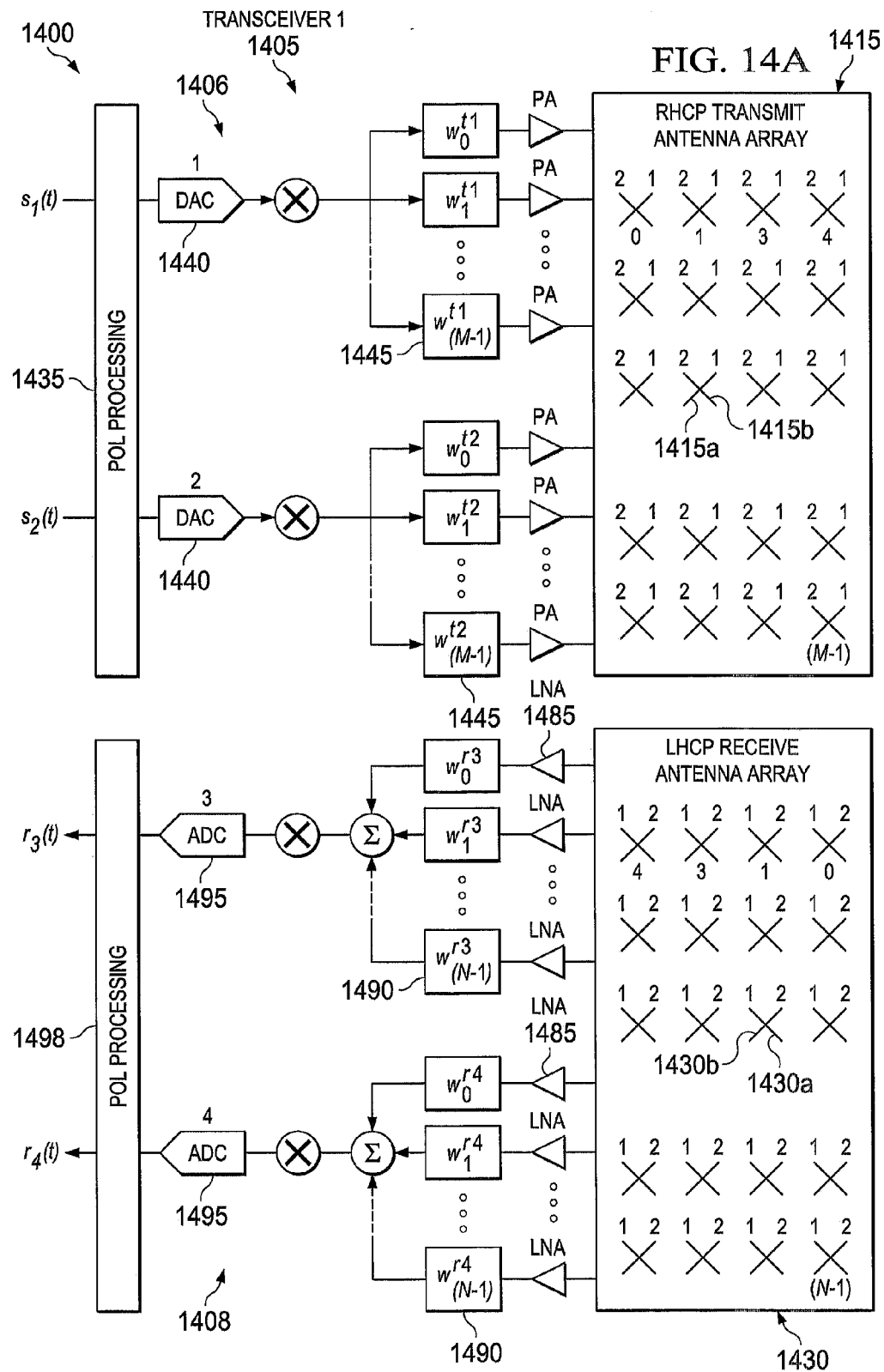

FIG. 14 illustrates an example of a full-duplex wireless communication system 1400 using circular polarization antenna arrays according to embodiments of the present disclosure. The embodiment of the full-duplex wireless communication system 1400 shown in FIG. 14 is for illustration only. Other embodiments could be used without departing from the scope of this disclosure.

In this illustrative embodiment, transceivers 1405 and 1410 use RHCP or LHCP antenna arrays for signal transmission or reception. The transmitter 1406 in transceiver 1405 transmits signals using RHCP antenna array 1415, while the receiver 1414 in transceiver 1410 receives signals using RHCP antenna array 1420. As illustrated, the RHCP transmitter antenna array 1415 includes M antenna elements, while the RHCP receiver antenna array 1420 includes N antenna elements.

The two digital signals $s_1$ and $s_2$ in transceiver 1405 are processed by a transmitter polarization processor 1435, converted to analog signals by a DAC 1440, up-converted to RF, and transmitted from antenna groups 1415*a* and 1415*b*, respectively. After up-conversion, the two signals can be further weighted by RF gains and phase shifts implemented by the blocks $W_0^{t1}$-$W_{(M-1)}^{t1}$ and $W_0^{t2}$-$W_{(M-1)}^{t2}$ 1445 before transmissions from the antenna groups 1415*a* and 1415*b*, respectively.

In this illustrative embodiment, the antenna groups 1415*a* and 1415*b* are cross polarized with each other. For example, the antenna group 1415*a* includes the antenna elements labeled with a "1" that transmit the signal $s_1$. The antenna group 1415*b* includes the antenna elements labeled with a "2" that transmit the signal $s_2$. Each antenna element in the antenna group 1415*a* is cross polarized with a respective one of the antenna elements in the antenna group 1415*b*.

In the transceiver 1410, the signals transmitted by transceiver 1405 are received by the antenna groups 1420*a* and 1420*b*, amplified by an LNA 1450, weighted by RF gains and phase shifts implemented by the blocks $W_0^{r1}$-$W_{(N-1)}^{r1}$ and $W_0^{r2}$-$W_{(N-1)}^{r2}$ 1455, and down-converted from RF. The down-converted signals are further converted to digital signals by an ADC 1460 and processed by a receiver polarization processor 1465.

Similar to the antenna array 1415, the antenna groups 1420*a* and 1420*b* of antenna array 1420 are cross polarized with each other. For example, the antenna group 1420*a* includes the antenna elements labeled with a "1" that receive the signal $s_1$. The antenna group 1420*b* includes the antenna elements labeled with a "2" that receive the signal $s_2$. Each antenna element in the antenna group 1420*a* is cross polarized with a respective one of the antenna elements in the antenna group 1420*b*.

The transmitter 1412 in transceiver 1410 transmits signals using LHCP antenna array 1425, while the receiver 1408 in transceiver 1405 receives signals using LHCP antenna array 1430. As illustrated, the LHCP transmitter antenna array 1425 includes M antenna elements, while the LHCP receiver antenna array 1430 includes N antenna elements.

As illustrated, the two digital signals $s_3$ and $s_4$ in transceiver 1410 are processed by a transmitter polarization processor 1470, converted to analog signals by a DAC 1475, up-converted to RF, and transmitted from antenna groups 1425*a* and 1425*b*, respectively. After up-conversion, the two signals can be further weighted by RF gains and phase shifts implemented by the blocks $W_0^{t3}$-$W_{(M-1)}^{t3}$ and $W_0^{t4}$-$W_{(M-1)}^{t4}$ 1480 before transmissions from the antenna groups 1425*a* and 1425*b*, respectively.

In this illustrative embodiment, the antenna groups 1425*a* and 1425*b* are cross polarized with each other. For example, the antenna group 1425*a* includes the antenna elements labeled with a "1" that transmit the signal $s_3$. The antenna group 1425*b* includes the antenna elements labeled with a "2" that transmit the signal $s_4$. Each antenna element in the antenna group 1425*a* is cross polarized with a respective one of the antenna elements in the antenna group 1425*b*.

In the transceiver 1405, the signals transmitted by transceiver 1410 are received by the antenna groups 1430*a* and antenna 1430*b*, amplified by an LNA 1485, weighted by RF gains and phase shifts implemented by the blocks $W_0^{r3}$-$W_{(N-1)}^{r2}$ and $W_0^{r4}$-$W_{(N-1)}^{r4}$ 1490, and down-converted from RF. The down-converted signals are further converted to digital signals by an ADC 1495 and processed by a receiver polarization processor 1498.

Similar to the antenna array 1425, the antenna groups 1430*a* and 1430*b* of antenna array 1430 are cross polarized with each other. For example, the antenna group 1430*a* includes the antenna elements labeled with a "1" that receive the signal $s_3$. The antenna group 1430*b* includes the antenna elements labeled with a "2" that receive the signal $s_4$. Each antenna element in the antenna group 1430*a* is cross polarized with a respective one of the antenna elements in the antenna group 1430*b*.

In this illustrative embodiment, both transceivers 1405 and 1410 transmit and receive signals simultaneously on the same frequency and at the same time providing a full-duplex operation. However, the transceiver 1405 and transceiver 1410 use different polarizations for transmit and receive signals reducing and/or eliminating the interference between transmit and receive signals. Moreover, separate RHCP and LHCP antenna arrays provide spatial separation further reducing interference between the transmit and the receive signals.

While FIG. 14 illustrates separate signals transmitted by the groups of antennas in each antenna array, in other embodiments similar to the embodiment illustrated in FIG. 12, the same signal $s_1$ may be transmitted from both the groups of the antennas in transmitter 1406 of transceiver 1405, while the same signal $s_2$ may be transmitted from both groups of antennas in transmitter 1412 of transceiver 1410.

Figure 15A:
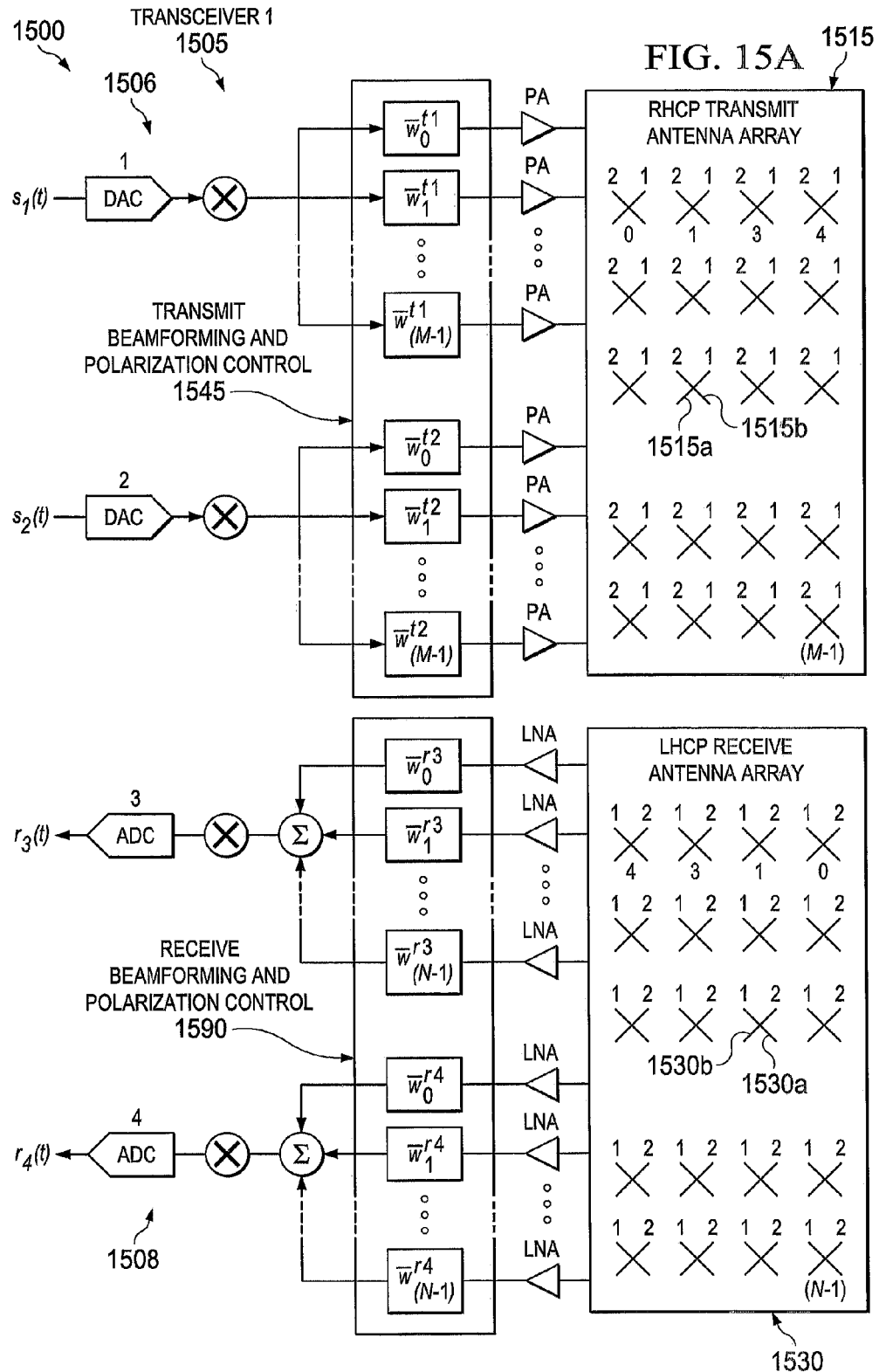
FIGS. 15A and 15B illustrate an example of a full-duplex wireless communication system using circular polarization antenna arrays and a combined beamforming and polarization operation according to embodiments of the present disclosure.
Figure 15B:
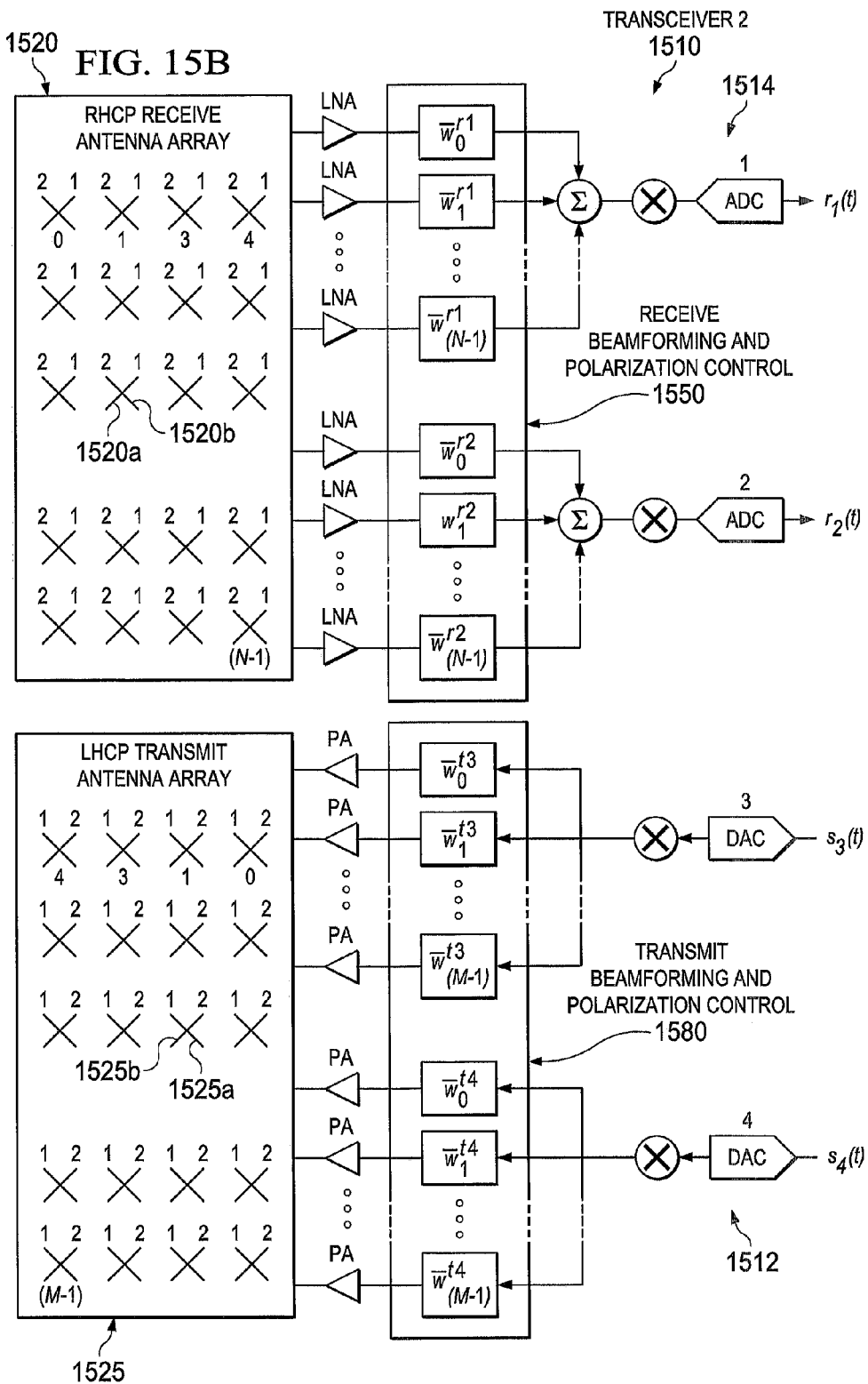

FIG. 15 illustrates an example of a full-duplex wireless communication system 1500 using circular polarization antenna arrays and a combined beamforming and polarization operation according to embodiments of the present disclosure. The embodiment of the full-duplex wireless communication system 1500 shown in FIG. 15 is for illustration only. Other embodiments could be used without departing from the scope of this disclosure.

In this illustrative embodiment, the wireless communication system 1500 is an example embodiment of the wireless communication system 1400 in FIG. 14 where the polarization processor operation is combined with the beamforming weight/beam steering operation. For example, the transmitter polarization processor operation implemented by the transmitter polarization processor 1435 and the beamforming weight/beam steering operation implemented by the blocks $W_0^{t1}$-$W_{(M-1)}^{t1}$ and $W_0^{t2}$-$W_{(M-1)}^{t2}$ 1445 from FIG. 14 is implemented in the wireless communication system 1500 in a single combined step by combined beamforming and polarization processing control blocks 1545 (i.e., blocks $\overline{W}_0^{t1}$-$\overline{W}_{(M-1)}^{t1}$ and $\overline{W}_0^{t2}$-$\overline{W}_{(M-1)}^{t2}$) before transmissions from the cross-polarized antenna groups 1515*a* and 1515*b* within the antenna array 1515.

Similarly, the combined beamforming and polarization processing control blocks 1580 (i.e., blocks $\overline{W}_0^{t3}$-$\overline{W}_{(M-1)}^{t3}$ and $\overline{W}_0^{t4}$-$\overline{W}_{(M-1)}^{t4}$) implement the transmitter polarization processor operation and beamforming weight/beam steering operation in a combined step before transmissions from the cross-polarized antenna groups 1525*a* and 1525*b* within the antenna array 1525.

The original beamforming weights can be expressed according to equation 3 below:

$$\begin{bmatrix} W_0^{t1} \\ W_1^{t1} \\ \vdots \\ W_{(M-1)}^{t1} \end{bmatrix} = \begin{bmatrix} a_0^{t1} e^{j\phi_0^{t1}} \\ a_1^{t1} e^{j\phi_1^{t1}} \\ \vdots \\ a_{(M-1)}^{t1} e^{j\phi_{(M-1)}^{t1}} \end{bmatrix}, \quad \text{[Eqn. 3]}$$

$$\begin{bmatrix} W_0^{t2} \\ W_1^{t2} \\ \vdots \\ W_{(M-1)}^{t2} \end{bmatrix} = \begin{bmatrix} a_0^{t2} e^{j\phi_0^{t2}} \\ a_1^{t2} e^{j\phi_1^{t2}} \\ \vdots \\ a_{(M-1)}^{t2} e^{j\phi_{(M-1)}^{t2}} \end{bmatrix},$$

$$\begin{bmatrix} W_0^{t3} \\ W_1^{t3} \\ \vdots \\ W_{(M-1)}^{t3} \end{bmatrix} = \begin{bmatrix} a_0^{t3} e^{j\phi_0^{t3}} \\ a_1^{t3} e^{j\phi_1^{t3}} \\ \vdots \\ a_{(M-1)}^{t3} e^{j\phi_{(M-1)}^{t3}} \end{bmatrix},$$

$$\begin{bmatrix} W_0^{t4} \\ W_1^{t4} \\ \vdots \\ W_{(M-1)}^{t4} \end{bmatrix} = \begin{bmatrix} a_0^{t4} e^{j\phi_0^{t4}} \\ a_1^{t4} e^{j\phi_1^{t4}} \\ \vdots \\ a_{(M-1)}^{t4} e^{j\phi_{(M-1)}^{t4}} \end{bmatrix}$$

where a represents the amplitude component of the weight, while $\phi$ represents the phase component of the beamforming weight. In order to generate, for example, an RHCP orientation, the beamforming weights $W_0^{t1}$-$W_{(M-1)}^{t1}$ applied to the antenna group 1415a in FIG. 14 can be rotated by 90° degrees ($\pi/2$ radians) as expressed in equation 4 below:

$$\begin{bmatrix} \overline{W}_0^{t1} \\ \overline{W}_1^{t1} \\ \vdots \\ \overline{W}_{(M-1)}^{t1} \end{bmatrix} = \begin{bmatrix} a_0^{t1} e^{j\phi_0^{t1}} \\ a_1^{t1} e^{j\phi_1^{t1}} \\ \vdots \\ a_{(M-1)}^{t1} e^{j\phi_{(M-1)}^{t1}} \end{bmatrix} \cdot \begin{bmatrix} e^{j\frac{\pi}{2}} \\ e^{j\frac{\pi}{2}} \\ \vdots \\ e^{j\frac{\pi}{2}} \end{bmatrix} = \begin{bmatrix} a_0^{t1} e^{j(\phi_0^{t1}+\frac{\pi}{2})} \\ a_1^{t1} e^{j(\phi_1^{t1}+\frac{\pi}{2})} \\ \vdots \\ a_{(M-1)}^{t1} e^{j(\phi_{(M-1)}^{t1}+\frac{\pi}{2})} \end{bmatrix} \quad \text{[Eqn. 4]}$$

$$\begin{bmatrix} \overline{W}_0^{t2} \\ \overline{W}_1^{t2} \\ \vdots \\ \overline{W}_{(M-1)}^{t2} \end{bmatrix} = \begin{bmatrix} a_0^{t2} e^{j\phi_0^{t2}} \\ a_1^{t2} e^{j\phi_1^{t2}} \\ \vdots \\ a_{(M-1)}^{t2} e^{j\phi_{(M-1)}^{t2}} \end{bmatrix} \cdot \begin{bmatrix} 1 \\ 1 \\ \vdots \\ 1 \end{bmatrix} = \begin{bmatrix} a_0^{t2} e^{j\phi_0^{t2}} \\ a_1^{t2} e^{j\phi_1^{t2}} \\ \vdots \\ a_{(M-1)}^{t2} e^{j\phi_{(M-1)}^{t2}} \end{bmatrix}$$

where $\overline{W}_0^{t1}$-$\overline{W}_{(M-1)}^{t1}$ and $\overline{W}_0^{t2}$-$\overline{W}_{(M-1)}^{t2}$ represent new weights (i.e., a combined beamforming and polarization weight) applied to the cross-polarized antenna group 1515a and antenna group 1515b within the antenna array 1515 as illustrated in FIG. 15. As expressed in equation 4, for RHCP, the weights (i.e., the combined beamforming and polarization weight) applied to antenna group 1515b are not modified from the original beamforming weight due to polarization consideration (i.e., the phase shift/time delay is implemented in the combined beamforming and polarization weight applied to the signal transmitted by the antenna group 1515a).

Similarly, in order to generate an LHCP orientation within the antenna array 1525, the combined beamforming and polarization weights $\overline{W}_0^{t3}$-$\overline{W}_{(M-1)}^{t3}$ and $\overline{W}_0^{t4}$-$\overline{W}_{(M-1)}^{t4}$ applied to the cross-polarized antenna groups 1525a and 1525b can be expressed according to equation 5 below:

$$\begin{bmatrix} \overline{W}_0^{t3} \\ \overline{W}_1^{t3} \\ \vdots \\ \overline{W}_{(M-1)}^{t3} \end{bmatrix} = \begin{bmatrix} a_0^{t3} e^{j\phi_0^{t3}} \\ a_1^{t3} e^{j\phi_1^{t3}} \\ \vdots \\ a_{(M-1)}^{t3} e^{j\phi_{(M-1)}^{t3}} \end{bmatrix} \cdot \begin{bmatrix} 1 \\ 1 \\ \vdots \\ 1 \end{bmatrix} = \begin{bmatrix} a_0^{t3} e^{j\phi_0^{t3}} \\ a_1^{t3} e^{j\phi_1^{t3}} \\ \vdots \\ a_{(M-1)}^{t3} e^{j\phi_{(M-1)}^{t3}} \end{bmatrix} \quad \text{[Eqn. 5]}$$

$$\begin{bmatrix} \overline{W}_0^{t4} \\ \overline{W}_1^{t4} \\ \vdots \\ \overline{W}_{(M-1)}^{t4} \end{bmatrix} = \begin{bmatrix} a_0^{t4} e^{j\phi_0^{t4}} \\ a_1^{t4} e^{j\phi_1^{t4}} \\ \vdots \\ a_{(M-1)}^{t4} e^{j\phi_{(M-1)}^{t4}} \end{bmatrix} \cdot \begin{bmatrix} e^{j\frac{\pi}{2}} \\ e^{j\frac{\pi}{2}} \\ \vdots \\ e^{j\frac{\pi}{2}} \end{bmatrix} = \begin{bmatrix} a_0^{t4} e^{j(\phi_0^{t4}+\frac{\pi}{2})} \\ a_1^{t4} e^{j(\phi_1^{t4}+\frac{\pi}{2})} \\ \vdots \\ a_{(M-1)}^{t4} e^{j(\phi_{(M-1)}^{t4}+\frac{\pi}{2})} \end{bmatrix}$$

where $\overline{W}_0^{t3}$-$\overline{W}_{(M-1)}^{t3}$ and $\overline{W}_0^{t4}$-$W_{(M-1)}^{t4}$ represent new weights applied to the cross-polarized groups 1525a and 1525b within the antenna array 1525. As expressed in equation 5, for LHCP, the weights (i.e., the combined beamforming and polarization weight) applied to antenna group 1525a are not modified from the original beamforming weight due to polarization consideration (i.e., the phase shift/time delay is implemented in the combined beamforming and polarization weight applied to the signal transmitted by the antenna group 1525b).

In the transceiver 1510, the combined beamforming and polarization processing control blocks 1550 (i.e., blocks $\overline{W}_0^{r1}$-$\overline{W}_{(N-1)}^{r1}$ and $\overline{W}_0^{r2}$-$W_{N-1}^{r2}$) implement the receiver polarization processor operation and beamforming weight/beam steering operation in a combined step after the signals transmitted by the transceiver 1505 are received by the antenna group 1520a and antenna group 1520b within the receive antenna array 1520. In order to generate, for example, the RHCP orientation in the receiver, the beamforming weights $W_0^{r1}$-$W_{(M-1)}^{r1}$ applied to the antenna group 1420a from FIG. 14 can be rotated by 90° degrees ($\lambda/2$ radians) as expressed according to equation 6 below:

$$\begin{bmatrix} \overline{W}_0^{r1} \\ \overline{W}_1^{r1} \\ \vdots \\ \overline{W}_{(M-1)}^{r1} \end{bmatrix} = \begin{bmatrix} a_0^{r1} e^{j\phi_0^{r1}} \\ a_1^{r1} e^{j\phi_1^{r1}} \\ \vdots \\ a_{(M-1)}^{r1} e^{j\phi_{(M-1)}^{r1}} \end{bmatrix} \cdot \begin{bmatrix} e^{j\frac{\pi}{2}} \\ e^{j\frac{\pi}{2}} \\ \vdots \\ e^{j\frac{\pi}{2}} \end{bmatrix} = \begin{bmatrix} a_0^{r1} e^{j(\phi_0^{r1}+\frac{\pi}{2})} \\ a_1^{r1} e^{j(\phi_1^{r1}+\frac{\pi}{2})} \\ \vdots \\ a_{(M-1)}^{r1} e^{j(\phi_{(M-1)}^{r1}+\frac{\pi}{2})} \end{bmatrix} \quad \text{[Eqn. 6]}$$

$$\begin{bmatrix} \overline{W}_0^{r2} \\ \overline{W}_1^{r2} \\ \vdots \\ \overline{W}_{(M-1)}^{r2} \end{bmatrix} = \begin{bmatrix} a_0^{r2} e^{j\phi_0^{r2}} \\ a_1^{r2} e^{j\phi_1^{r2}} \\ \vdots \\ a_{(M-1)}^{r2} e^{j\phi_{(M-1)}^{r2}} \end{bmatrix} \cdot \begin{bmatrix} 1 \\ 1 \\ \vdots \\ 1 \end{bmatrix} = \begin{bmatrix} a_0^{r2} e^{j\phi_0^{r2}} \\ a_1^{r2} e^{j\phi_1^{r2}} \\ \vdots \\ a_{(M-1)}^{r2} e^{j\phi_{(M-1)}^{r2}} \end{bmatrix}$$

where $\overline{W}_0^{r1}$-$\overline{W}_{(N-1)}^{r1}$ and $\overline{W}_0^{r2}$-$\overline{W}_{(N-1)}^{r2}$ represent new weights applied to the cross-polarized antenna group 1520a and antenna group 1520b within the antenna array 1520. As expressed in equation 6, for RHCP, the weights (i.e., the combined beamforming and polarization weight) applied to antenna group 1520b are not modified from the original beamforming weight due to polarization consideration (i.e., the phase shift/time delay is implemented in the combined beamforming and polarization weight applied to the signal transmitted by the antenna group 1520a).

Similarly, in the transceiver 1505, the combined beamforming and polarization processing control blocks 1590 (i.e., blocks $\overline{W}_0^{r3}$-$\overline{W}_{(N-1)}^{r3}$ and $\overline{W}_0^{r4}$-$\overline{W}_{(N-1)}^{r4}$) implement the receiver polarization processor operation and beamforming weight/beam steering operation in a combined step after the signals transmitted by the transceiver 1510 are received by the antenna group 1530a and antenna group 1530b within the receive antenna array 1530.

In order to generate, for example, the LHCP orientation in the receiver, the beamforming weights $\overline{W}_0^{r4}$-$\overline{W}_{(N-1)}^{r4}$ applied to the antenna group 1430a from FIG. 14 can be rotated by 90° degrees ($\lambda/2$ radians) as expressed according to equation 7 below as:

$$\begin{bmatrix} \overline{W}_0^{tr3} \\ \overline{W}_1^{r3} \\ \vdots \\ \overline{W}_{(M-1)}^{r3} \end{bmatrix} = \begin{bmatrix} a_0^{r3} e^{j\phi_0^{r3}} \\ a_1^{r3} e^{j\phi_1^{r3}} \\ \vdots \\ a_{(M-1)}^{r3} e^{j\phi_{(M-1)}^{r3}} \end{bmatrix} \cdot \begin{bmatrix} 1 \\ 1 \\ \vdots \\ 1 \end{bmatrix} = \begin{bmatrix} a_0^{r3} e^{j\phi_0^{r3}} \\ a_1^{r3} e^{j\phi_1^{r3}} \\ \vdots \\ a_{(M-1)}^{r3} e^{j\phi_{(M-1)}^{r3}} \end{bmatrix} \quad \text{[Eqn. 7]}$$

$$\begin{bmatrix} \overline{W}_0^{r4} \\ \overline{W}_1^{r4} \\ \vdots \\ \overline{W}_{(M-1)}^{r4} \end{bmatrix} = \begin{bmatrix} a_0^{r4} e^{j\phi_0^{r4}} \\ a_1^{r4} e^{j\phi_1^{r4}} \\ \vdots \\ a_{(M-1)}^{r4} e^{j\phi_{(M-1)}^{r4}} \end{bmatrix} \cdot \begin{bmatrix} e^{j\frac{\pi}{2}} \\ e^{j\frac{\pi}{2}} \\ \vdots \\ e^{j\frac{\pi}{2}} \end{bmatrix} = \begin{bmatrix} a_0^{r4} e^{j(\phi_0^{r4}+\frac{\pi}{2})} \\ a_1^{r4} e^{j(\phi_1^{r4}+\frac{\pi}{2})} \\ \vdots \\ a_{(M-1)}^{r4} e^{j(\phi_{(M-1)}^{r4}+\frac{\pi}{2})} \end{bmatrix}$$

where $\overline{W}_0^{r3}$-$\overline{W}_{(N-1)}^{r3}$ and $\overline{W}_0^{r4}$-$\overline{W}_{(N-1)}^{r4}$ represent new weights applied to the cross-polarized antenna group 1530a and antenna group 1530b within the antenna array 1530. As expressed in equation 7, for LHCP, the weights (i.e., the combined beamforming and polarization weight) applied to antenna group 1530a are not modified from the original beamforming weight due to polarization consideration (i.e., the phase shift/time delay is implemented in the combined beamforming and polarization weight applied to the signal transmitted by the antenna group 1530b).

As discussed above, both beamforming control and polarization alignment can be performed in a single functional block without requiring a separate polarization processor to implement the polarization based full-duplexing scheme of the present disclosure. In some embodiments, feedback can also be provided allowing receivers (i.e., receivers 1508 and 1514) to request a polarization orientation preference and/or change by the transmitter (i.e., transmitters 1506 and 1512).

While FIG. 15 illustrates separate signals transmitted by the groups of antennas in each antenna array, in other embodiments similar to the embodiment illustrated in FIG. 15, the same signal $s_1$ may be transmitted from both the groups of the antennas in transmitter 1506 of transceiver 1505, while the same signal $s_2$ may be transmitted from both groups of antennas in transmitter 1512 of transceiver 1510.

Additionally, while various embodiments above illustrate communication between two transceivers, the embodiments described above may also be implemented in a multi-point communication system. For example, the Transceiver 1 may transmit one or more signals to one receiver at a point in the wireless multi-point communication system and may receive one or more signals from a transmitter at another point in the wireless multi-point communication system. In other examples, the Transceiver 1 may steer multiple beams to transmit signals to one or more points and receive signals from one or more points in the wireless multi-point communication system. In these embodiments, the spatial multiplexing of transmitting to and receiving from different points may be utilized to further reduce and/or eliminate interference between transmitted and received signals.

Figure 16:
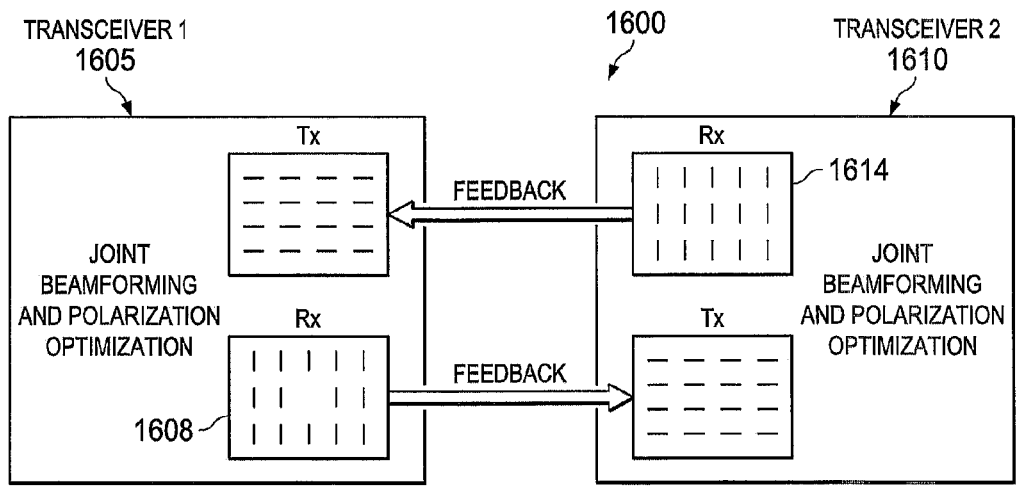
FIG. 16 illustrates an example of a full-duplex wireless communication system implementing joint optimization of beamforming and polarization according to embodiments of the present disclosure.

FIG. 16 illustrates an example of a full-duplex wireless communication system 1600 implementing joint optimization of beamforming and polarization according to embodiments of the present disclosure. The embodiment of the full-duplex wireless communication system 1600 shown in FIG. 16 is for illustration only. Other embodiments could be used without departing from the scope of this disclosure.

In this illustrative embodiment, the transceiver 1605 performs a joint optimization of the beamforming and polarization to reduce and/or optimize the transmit signal interference at receiver 1608, which permits and/or improves efficiency of the full-duplex operation at the transceiver 1605. Similarly, transceiver 1610 performs a joint optimization of the beamforming and polarization to reduce and/or optimize the transmit signal interference at receiver 1614, which permits and/or improves efficiency of the full-duplex operation at the transceiver 1610. Additionally, transceiver 1605 can provide feedback to transceiver 1610, and transceiver 1605 can provide feedback to transceiver 1610 on their preferred beamforming and polarization. As a result, a global optimization can be performed, and full-duplex operation can be performed at both the transceiver 1605 and transceiver 1610, simultaneously.

Figure 17:
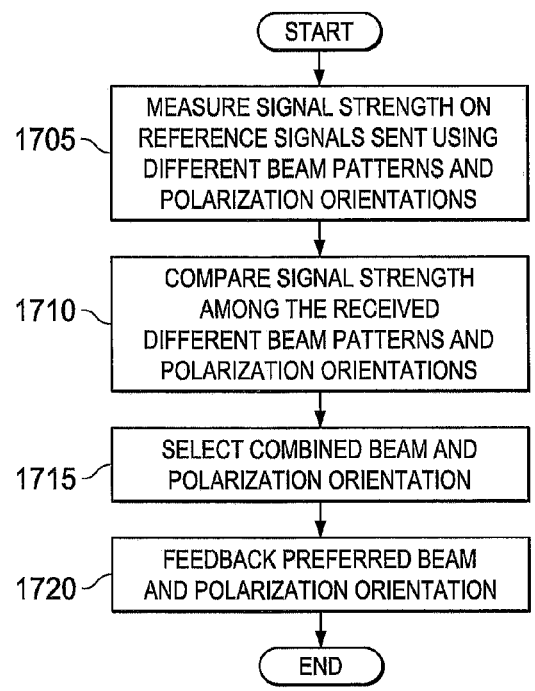
FIG. 17 illustrates a flowchart of a process for combined beamforming and polarization feedback according to embodiments of the present disclosure.

FIG. 17 illustrates a flowchart of a process for combined beamforming and polarization feedback according to embodiments of the present disclosure. The process illustrated in FIG. 17 is for illustration only. Other embodiments could be used without departing from the scope of this disclosure.

In this illustrative embodiment, a transmitter sends and a receiver receives and measures signal strength on reference signals sent using different beam patterns and polarization orientations (step 1705). For example, without limitation, the polarization orientations may be horizontal/vertical, RHCP/LHCP, and or RHEP/LHEP. The receiver then compares the signal strength among the received different beam patterns and the polarization orientations (step 1710). The receiver then selects the combined beam and polarization orientation (step 1715). For example, the receiver may select the combined beam and polarization orientation that provides the maximum received signal strength. Thereafter, the receiver sends feedback on the preferred beam and polarization orientation (step 1720), with the process terminating thereafter. Additional description and examples of feedback for polarization alignment is described in U.S. patent application Ser. No. 13/599,795, filed Aug. 30, 2012, and entitled "APPARATUS AND METHOD FOR POLARIZATION ALIGNMENT IN A WIRELESS NETWORK", which is incorporated by reference herein.

Although FIG. 17 illustrates an example of a process for combined beamforming and polarization feedback, various changes could be made to FIG. 17. For example, while shown as a series of steps, various steps in each figure could overlap, occur in parallel, occur in a different order, or occur multiple times.

In various embodiments, transceivers can exchange information on what polarization to use for transmit and receive signals. Additionally, in any of the embodiments described herein, one of the two transceivers can act as a base station (e.g., an evolved node B (eNB), a remote-radio head, a relay station, an underlay base station, etc.), while the second one as a mobile station (e.g., a user equipment (UE), subscriber station, etc.). In yet other embodiments, a base station can communicate with multiple mobile stations in a full-duplex operation in a multipoint communication system in accordance with the principals of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication system comprising:
a first transceiver configured to transmit and receive wireless signals to and from at least a second transceiver, the first transceiver comprising:
transmitter processing circuitry configured to apply a beamforming weight to a first signal to steer a beam on which the first signal is transmitted and to apply a first polarization weight to the first signal in a single step by applying a combined beamforming and polarization weight to the first signal;
a plurality of transmitter antennas, at least one of the transmitter antennas configured to transmit the first signal with the first polarization weight to at least the second transceiver; and
a plurality of receiver antennas, at least one of the receiver antennas configured to receive a second signal with a second polarization from the second transceiver, wherein the second polarization is cross polarized with the first polarization.

2. The wireless communication system of claim 1, wherein the transmitter antennas and the receiver antennas are configured to transmit and receive, respectively, in a same frequency band and during a same time period.

3. The wireless communication system of claim 1, wherein at least a second of the transmitter antennas is configured to transmit a third signal that is leading or lagging the first signal by a time/phase difference to form a transmitted wave with the first polarization weight.

4. The wireless communication system of claim 3, wherein the first transceiver further comprises:
a phase shift or time delay block configured to phase shift or time delay block one of the first signal or the second signal to lag the other of the first signal or the second signal by the time/phase difference.

5. The wireless communication system of claim 3, wherein the plurality of transmitter antennas is an array of transmitter antennas comprising:
a first group of transmitter antennas, which includes the at least one of the transmitter antennas, the first group of transmitter antennas configured to transmit the first signal; and
a second group of transmitter antennas, which includes the second of the transmitter antennas, the second group of transmitter antennas configured to transmit the third signal.

6. The wireless communication system of claim 5, wherein:
the transmitter processing circuitry is first transmitter processing circuitry;
the combined beamforming and polarization weight is a first combined beamforming and polarization weight;
the first transmitter processing circuitry configured to apply the first combined beamforming and polarization weight to the first signal transmitted by the first group of transmitter antennas; and
the first transceiver further comprises second transmitter processing circuitry configured to apply a second combined beamforming and polarization weight to the third signal transmitted by the second group of transmitter antennas.

7. The wireless communication system of claim 6, wherein the antennas in the first group of transmitter antennas are cross polarized with the antennas of the second group of transmitter antennas, respectively.

8. The wireless communication system of claim 1, further comprising:
the second transceiver comprising:
a plurality of transmitter antennas, at least one of the transmitter antennas in the second transceiver configured to transmit the second signal with the second polarization weight; and
a plurality of receiver antennas, at least one of the receiver antennas in the second transceiver configured to receive the first signal with the first polarization that is cross polarized with the second polarization.

9. The wireless communication system of claim 1, wherein the first transceiver is configured to receive feedback from the second transceiver about a preferred beamforming and polarization scheme, and to transmit the first signal using the preferred beamforming and polarization scheme of the second transceiver based on the feedback.

10. An apparatus in a first transceiver capable of transmitting and receiving wireless signals to and from at least a second transceiver, the apparatus comprising:
transmitter processing circuitry configured to apply a beamforming weight to a first signal to steer a beam on which the first signal is transmitted and to apply a first polarization weight to the first signal in a single step by applying a combined beamforming and polarization weight to the first signal;
a plurality of transmitter antennas, at least one of the transmitter antennas configured to transmit the first signal with the first polarization weight to at least the second transceiver; and
a plurality of receiver antennas, at least one of the receiver antennas configured to receive a second signal with a second polarization from the second transceiver, wherein the second polarization is cross polarized with the first polarization.

11. The apparatus of claim 10, wherein the transmitter antennas and the receiver antennas are configured to transmit and receive, respectively, in a same frequency band and during a same time period.

12. The apparatus of claim 10, wherein at least a second of the transmitter antennas is configured to transmit a third signal that is leading or lagging the first signal by a time/phase difference to form a transmitted wave with the first polarization weight.

13. The apparatus of claim 12, wherein the plurality of transmitter antennas is an array of transmitter antennas comprising:
a first group of transmitter antennas, which includes the at least one of the transmitter antennas, the first group of transmitter antennas configured to transmit the first signal; and
a second group of transmitter antennas, which includes the second of the transmitter antennas, the second group of transmitter antennas configured to transmit the third signal.

14. The apparatus of claim 13,
wherein the transmitter processing circuitry is first transmitter processing circuitry,
wherein the combined beamforming and polarization weight is a first combined beamforming and polarization weight, and
wherein the first transmitter processing circuitry configured to apply the first combined beamforming and polarization weight to the first signal transmitted by the first group of transmitter antennas,
the apparatus further comprises second transmitter processing circuitry configured to apply a second combined beamforming and polarization weight to the third signal transmitted by the second group of transmitter antennas.

15. The apparatus of claim 14, wherein the antennas in the first group of transmitter antennas are cross polarized with the antennas of the second group of transmitter antennas, respectively.

16. The apparatus of claim 12, wherein the first transceiver further comprises:
a phase shift or time delay block configured to phase shift or time delay block one of the first signal or the second signal to lag the other of the first signal or the second signal by the time/phase difference.

17. The apparatus of claim 10, wherein at least one of the receiver antennas is configured to receive feedback from the second transceiver about a preferred beamforming and polarization scheme, and the at least one transmitter antenna is configured transmit the first signal using the preferred beamforming and polarization scheme of the second transceiver based on the feedback.

18. A method for transmitting and receiving wireless signals by a first transceiver, the method comprising:
applying a beamforming weight to a first signal to steer a beam on which the first signal is transmitted and a first polarization weight to the first signal in a single step by applying a combined beamforming and polarization weight to the first signal;
transmitting, using at least one of a plurality of transmitter antennas in the first transceiver, the first signal with the first polarization weight to at least a second transceiver; and
receiving, using at least one of a plurality of receiver antennas in the first transceiver, a second signal with a second polarization from the second transceiver in a same frequency band and during a same time period as the transmitting of the first signal, wherein the second polarization is cross polarized with the first polarization.

19. The method of claim 18 further comprising:
receiving feedback from the second transceiver about a preferred beamforming and polarization scheme; and
transmitting the first signal using the preferred beamforming and polarization scheme of the second transceiver based on the feedback.

20. The method of claim 18, wherein the transmitter antennas and the receiver antennas transmit and receive, respectively, in a same frequency band and during a same time period.

* * * * *